US011646163B2

(12) United States Patent
Masuda et al.

(10) Patent No.: US 11,646,163 B2
(45) Date of Patent: May 9, 2023

(54) ELECTRONIC DEVICE

(71) Applicant: TDK CORPORATION, Tokyo (JP)

(72) Inventors: Akihiro Masuda, Tokyo (JP); Shinya Ito, Tokyo (JP); Norihisa Ando, Tokyo (JP); Kosuke Yazawa, Tokyo (JP); Yoshiki Satou, Tokyo (JP); Katsumi Kobayashi, Tokyo (JP); Toshihiro Iguchi, Tokyo (JP); Kenya Tamaki, Tokyo (JP); Shinya Saito, Tokyo (JP)

(73) Assignee: TDK CORPORATION, Tokyo (JP)

(*) Notice: Subject to any disclaimer, the term of this patent is extended or adjusted under 35 U.S.C. 154(b) by 185 days.

(21) Appl. No.: 17/228,822

(22) Filed: Apr. 13, 2021

(65) Prior Publication Data

US 2021/0375553 A1 Dec. 2, 2021

(30) Foreign Application Priority Data

May 27, 2020 (JP) .............................. JP2020-092330

(51) Int. Cl.
  *H01F 27/28* (2006.01)
  *H01G 4/224* (2006.01)
  *H01G 4/228* (2006.01)
  *H01G 4/38* (2006.01)
  *H01G 4/40* (2006.01)

(52) U.S. Cl.
  CPC .............. *H01G 4/40* (2013.01); *H01F 27/28* (2013.01); *H01G 4/224* (2013.01); *H01G 4/228* (2013.01); *H01G 4/38* (2013.01)

(58) Field of Classification Search
  CPC ...... H01F 27/28; H01F 27/2823; H01F 27/29; H01F 27/40; H01G 2/06; H01G 2/106; H01G 4/224; H01G 4/228; H01G 4/236; H01G 4/38; H01G 4/40
  USPC .................................................. 361/270, 807
  See application file for complete search history.

(56) References Cited

U.S. PATENT DOCUMENTS

2019/0115140 A1* 4/2019 Morinaga ............. H01F 27/292

FOREIGN PATENT DOCUMENTS

| DE | 4025159 A1 * | 2/1992 | ........... H03H 1/0007 |
| JP | H0557811 U * | 7/1993 | ............. H01F 27/00 |
| JP | H0587909 U * | 11/1993 | ............. H01F 27/06 |
| JP | H0642323 Y2 * | 11/1994 | ............. H01F 27/00 |
| JP | 2536998 Y2 * | 5/1997 | ............. H01F 27/29 |

(Continued)

*Primary Examiner* — Timothy J Thompson
*Assistant Examiner* — Guillermo J Egoavil
(74) *Attorney, Agent, or Firm* — Oliff PLC

(57) ABSTRACT

An electronic device includes first and second capacitors, a case, a coil, and first to fourth conductive terminals. The first capacitor includes first and second terminal electrodes. The second capacitor includes third and fourth terminal electrodes. The case includes an accommodation recess for accommodating the first and second capacitors. The coil is separated from the first and second capacitors by a part of the case and disposed outside the accommodation recess. The first terminal is connected to the first electrode and partly disposed on a mounting-side bottom surface of the case. The second terminal is connected to one end of the coil and the second electrode and partly disposed on the surface. The third terminal is connected to the other end of the coil and the third electrode and partly disposed on the surface. The fourth terminal is connected to the fourth electrode and partly disposed on the surface.

11 Claims, 19 Drawing Sheets

(56) References Cited

FOREIGN PATENT DOCUMENTS

| | | | | | |
|---|---|---|---|---|---|
| JP | H09232157 | A | * 9/1997 | ............. | H01F 27/29 |
| JP | H11-102837 | A | 4/1999 | | |
| JP | 2007043854 | A | * 2/2007 | ............... | H02K 5/22 |
| JP | 2008244116 | A | * 10/2008 | ............. | H01F 17/04 |
| JP | 2018160489 | A | * 10/2018 | ............... | H05K 1/18 |

* cited by examiner

π filter (C-L-C C-L-C)

LC filter (C-L-C-L-C)

ELECTRONIC DEVICE

BACKGROUND OF THE INVENTION

The present invention relates to an electronic device including capacitors and a coil.

A circuit in which a coil and a capacitor are combined, such as noise filters, may be formed on a mounting board or so. Noise filters or so are conventionally formed by, for example, individually mounting a coil element and a capacitor element as shown in Patent Document 1 on a mounting board and electrically connecting these elements via the board.

In the conventional manner in which the coil and the capacitor are individually mounted on the board, however, both of an area for mounting the coil and an area for mounting the capacitor need to be secured on the mounting board. Thus, the prior arts have a problem of high-density mounting or so. When the coil and the capacitor are individually mounted on the board, the prior arts further have a problem of productivity because, for example, a mounting machine frequently transports the elements to a mounting position on the mounting board.

Patent Document 1: JPH11102837 (A)

BRIEF SUMMARY OF INVENTION

The present invention has been achieved under such circumstances. It is an object of the invention to provide an electronic device that is advantageous for high-density mounting and simplification of mounting process.

To achieve the above object, an electronic device according to the present invention comprises:

a first capacitor including a first terminal electrode and a second terminal electrode;

a second capacitor including a third terminal electrode and a fourth terminal electrode;

a case including an accommodation recess for accommodating the first capacitor and the second capacitor;

a coil separated from the first capacitor and the second capacitor by a part of the case and disposed outside the accommodation recess;

a first conductive terminal connected to the first terminal electrode and partly disposed on a mounting-side bottom surface of the case;

a second conductive terminal connected to one end of the coil and the second terminal electrode and partly disposed on the mounting-side bottom surface;

a third conductive terminal connected to the other end of the coil and the third terminal electrode and partly disposed on the mounting-side bottom surface; and a fourth conductive terminal connected to the fourth terminal electrode and partly disposed on the mounting-side bottom surface.

The electronic device according to the present invention includes at least one coil and two capacitors, and the capacitors and the coil are arranged integrally via the case. Moreover, the terminal electrodes of the capacitors and the coil are connected using the first to fourth conductive terminals and all of the conductive terminals are partly arranged on the mounting-side bottom surface of the case. Since the coil and the capacitors do not need to be mounted independently due to their integral arrangement, the electronic device is advantageous for high-density mounting and simplification of mounting process. Since all of the conductive terminals are partly arranged on the mounting-side bottom surface of the case, the electric connection to the electronic device can be changed freely on the mounting board side, and the electronic device can thereby be used as various types of filters. Since the capacitors are accommodated in the accommodation recess of the case, the electronic device is assembled easily. Since the capacitors are arranged in the accommodation recess and the coil is disposed outside the accommodation recess, the insulation between the coil and the capacitors can easily be secured.

For example, the case may include an open edge surface disposed around an opening of the accommodation recess, and the open edge surface may be the mounting-side bottom surface.

Since the distance between the first to fourth terminal electrodes in the accommodation recess and the mounting-side bottom surface can be small, such an electronic device is advantageous for downsizing the first to fourth conductive terminals and reducing the DC resistance.

For example, the coil may be made of a wire winding an outer wall of the case.

The coil included in the electronic device is not limited and may be a multilayer-type chip coil or so, but may also be a coil made of a wire winding the outer wall of the case. The electronic device using the coil made of the wire is advantageous for being able to reduce the DC resistance and easily correspond with a comparatively high electric current value.

For example, the case may include: a first protrusion portion formed closer to the mounting-side bottom surface than the coil on the outer wall; and a second protrusion portion formed farther from the mounting-side bottom surface than the coil on the outer wall.

When the case includes the first protrusion portion and the second protrusion portion, the coil is further securely held by the case. Thus, such an electronic device is advantageous for impact resistance or so. In addition, the first protrusion portion and the second protrusion portion can act as guides at the time of winding the wire around the outer wall of the case.

For example, the coil and the first and second capacitors may at least partly overlap with each other in a parallel direction to the mounting-side bottom surface.

Such an electronic device is advantageous for low profile because the capacitors can partly be arranged inside the coil.

For example, the coil and the first and second capacitors may not overlap with each other in a parallel direction to the mounting-side bottom surface.

Such an electronic device can greatly adjust characteristics of the coil by changing a core material disposed inside the coil. The inductance value can be improved by, for example, disposing a core material having a high magnetic permeability inside the coil.

For example, at least either one of the first conductive terminal and the second conductive terminal and at least either one of the third conductive terminal and the fourth conductive terminal may include a curved portion for elastically contacting with the first capacitor or the second capacitor in the accommodation recess.

When the conductive terminals include the curved portion, the conductive terminals and the terminal electrodes are connected in a pressure contact state and do not need to be connected by a connection member, such as solder and conductive adhesive agent. Since the terminals and electrodes can be connected using no solder, copper, copper alloy, or the like can be used as the material of the terminals and the equivalent series resistance (ESR) can be reduced. Since no solder is needed, it is possible to prevent a problem of generation of cracks in the chip components due to, for example, difference in thermal expansion generated at the time of solder connection.

For example, the first to fourth conductive terminals may include an engagement piece for engaging with the case.

The conductive terminals including such an engagement piece can easily and securely be fixed to the case just by being inserted into the case.

For example, the case may include a partition wall for partitioning the first capacitor and the second capacitor in the accommodation recess.

When the case includes the partition wall, it is possible to favorably secure an insulation distance between the terminal electrodes of the first capacitor and the terminal electrodes of the second capacitor, and the first to fourth conductive terminals and the first and second capacitors are positioned easily at the time of assembling the electronic device.

For example, the accommodation recess may be filled with resin.

The accommodation recess of the case can be used as a filling space of resin. When the accommodation recess is filled with resin, such an electronic device can improve insulation property, heat dissipation, and the like.

For example, the case may include: an engagement protrusion portion formed on an outer wall perpendicular to the mounting-side bottom surface; and an engagement recess portion disposed on the outer wall facing the engagement protrusion portion and engageable with the engagement protrusion portion.

When the case includes such engagement protrusion portion and engagement recess portion, a plurality of electronic devices can be connected to each other. An electronic device that is more advantageous for simplification of mounting process can be obtained by connecting a plurality of electronic devices.

DETAILED DESCRIPTION OF INVENTION

Hereinafter, the present invention is explained based on embodiments shown in the figures.

First Embodiment

Figure 1:
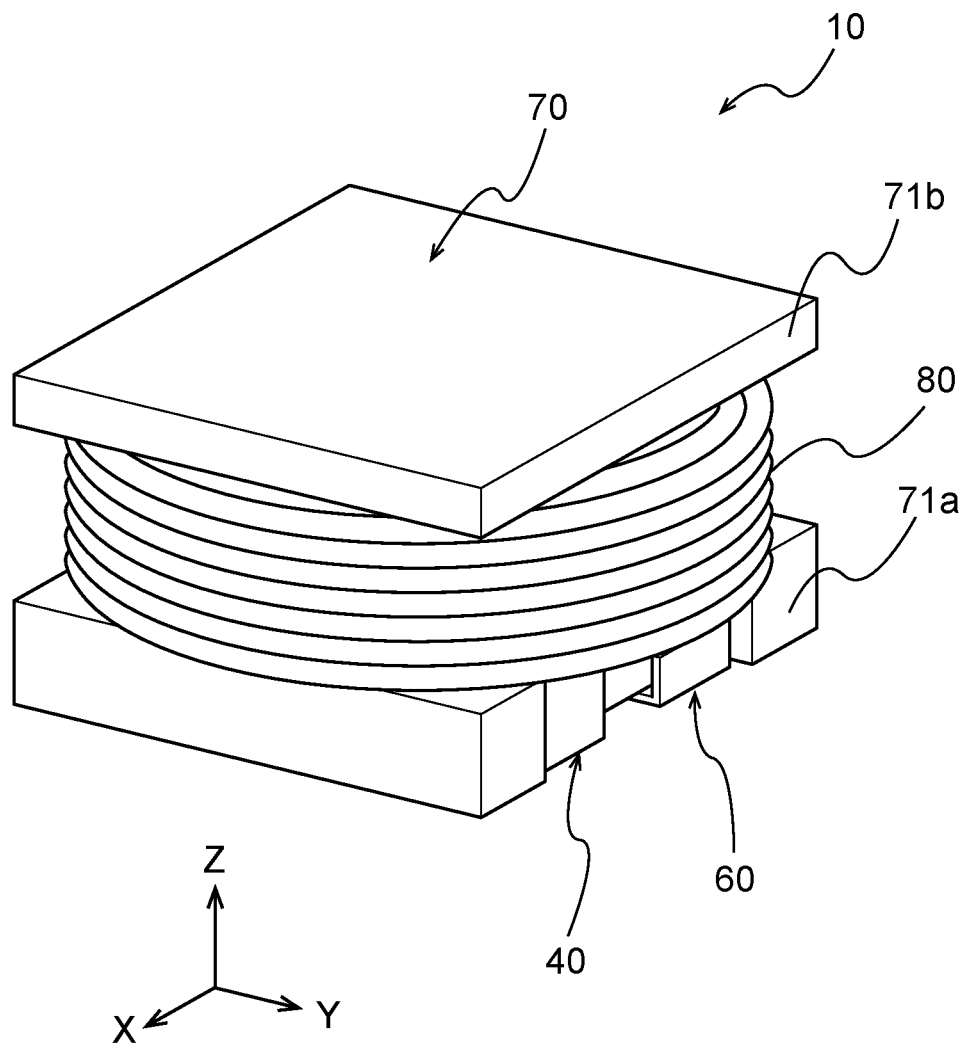
FIG. 1 is a schematic perspective view of an electronic device according to First Embodiment of the present invention from diagonally above.

FIG. 1 is a schematic perspective view of an electronic device 10 according to First Embodiment of the present invention from diagonally above. As shown in FIG. 1, the electronic device 10 includes a case 70, a coil 80 wound around the case 70, a second conductive terminal 40, and a fourth conductive terminal 60. The electronic device 10 has a substantially rectangular parallelepiped outer shape, but may have any other shape, such as columnar shape and hexagonal columnar shape.

Figure 2:
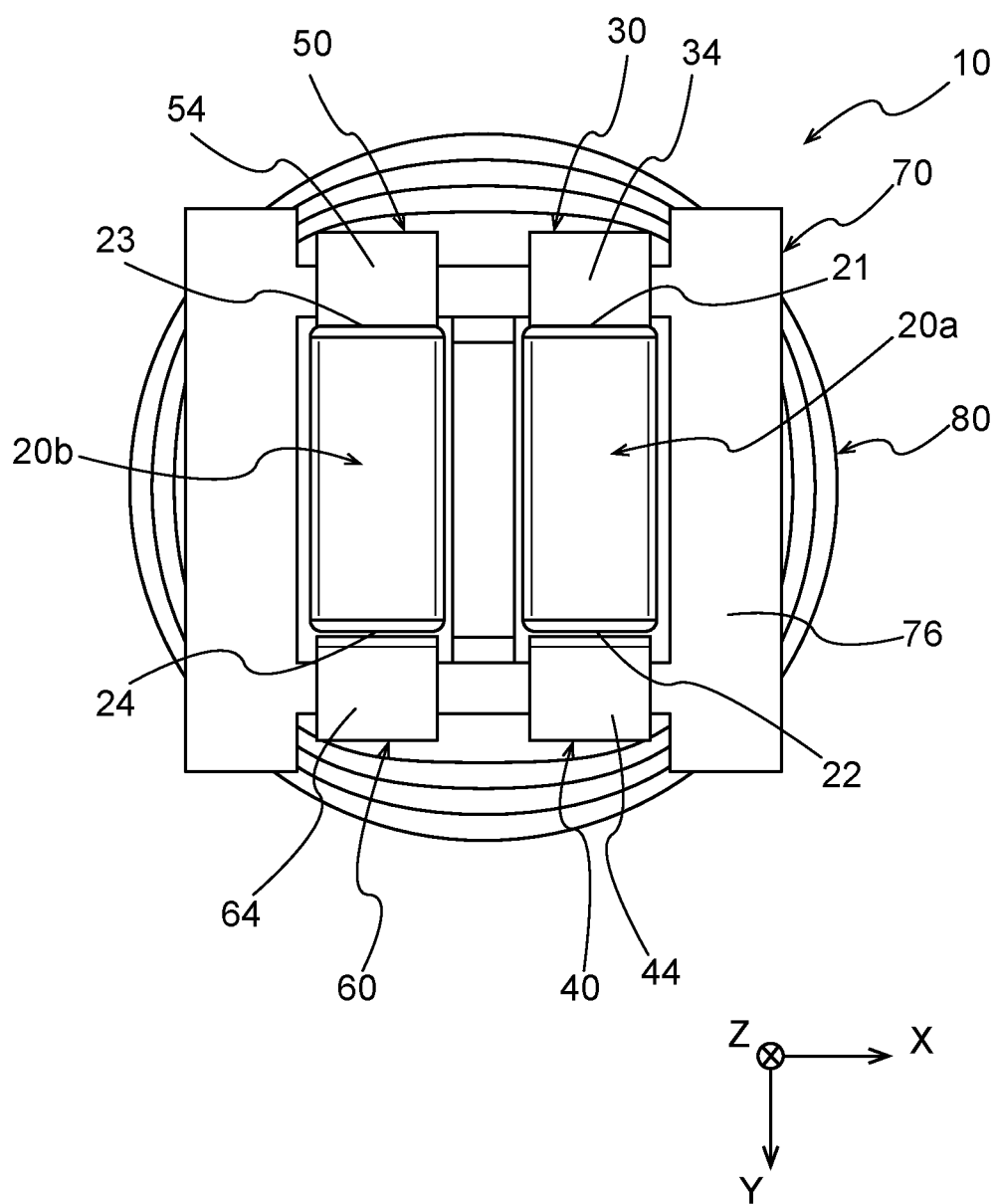
FIG. 2 is a bottom view of the electronic device shown in FIG. 1.

FIG. 2 is a bottom view of the electronic device 10 shown in FIG. 1 from below. As shown in FIG. 2, the electronic device 10 further includes a first capacitor 20a, a second capacitor 20b, a first conductive terminal 30, and a third conductive terminal 50. In the explanation of the electronic device 10, as shown in FIG. 2, the X-axis direction is a direction where the first capacitor 20a and the second capacitor 20b are arranged, the Y-axis direction is a perpendicular direction to the X-axis direction where the first conductive terminal 30 and the second conductive terminal 40 (or the third conductive terminal 50 and the fourth conductive terminal 60) are arranged, and the Z-axis direction is a perpendicular direction to the X-axis direction and the Y-axis direction.

Figure 3:
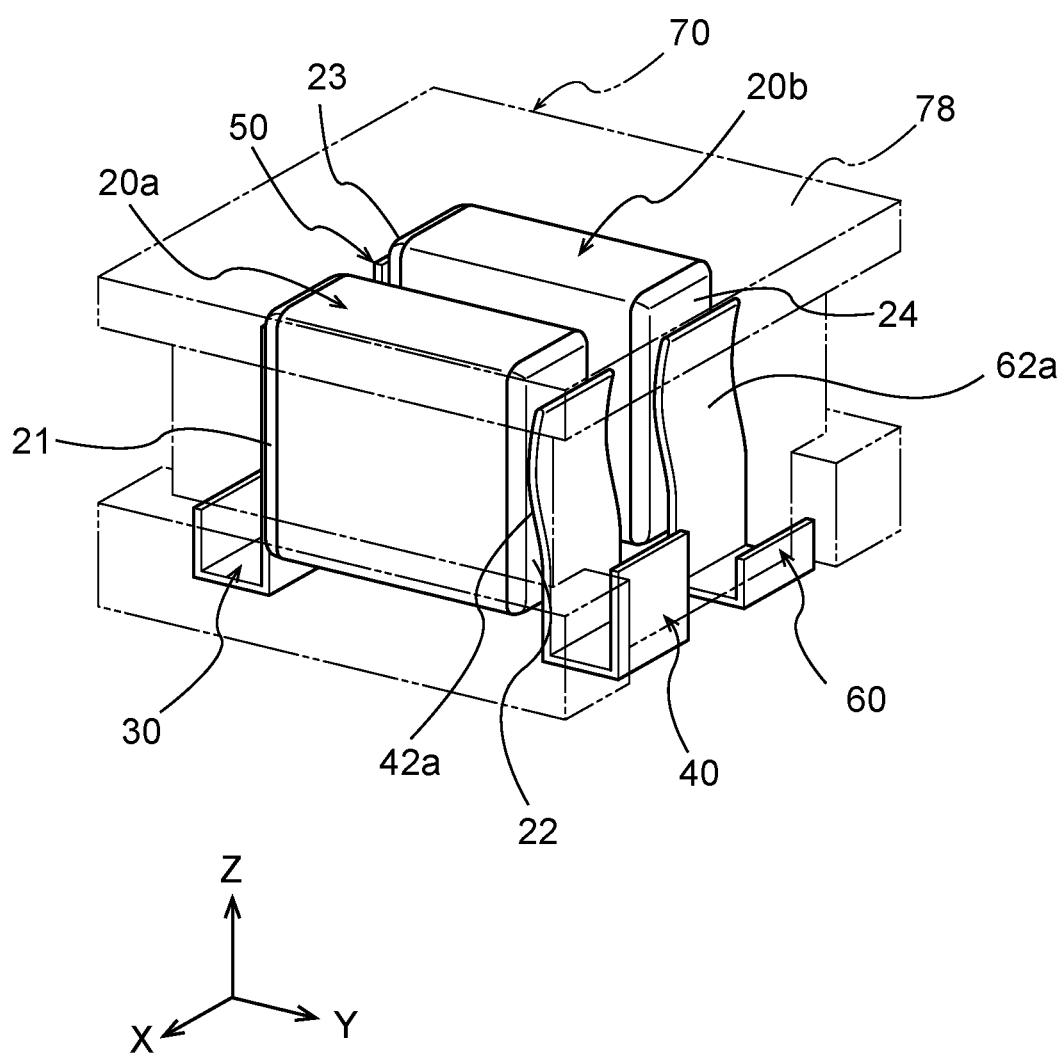
FIG. 3 is a conceptual view transparently illustrating a case of the electronic device shown in FIG. 1.

FIG. 3 is a conceptual view transparently illustrating the case 70 of the electronic device 10 shown in FIG. 1. As shown in FIG. 3, the first capacitor 20a and the second capacitor 20b are substantially rectangular parallelepiped chip capacitors and have substantially the same shape and size, but the first capacitor 20a and the second capacitor 20b may have different shapes and sizes.

As shown in FIG. 3, the first capacitor 20a includes a first terminal electrode 21 and a second terminal electrode 22. The first terminal electrode 21 is disposed on an end surface of the first capacitor 20a facing the negative side in the Y-axis direction, and the second terminal electrode 22 is disposed on an end surface of the first capacitor 20a facing the positive side in the Y-axis direction. That is, the first terminal electrode 21 and the second terminal electrode 22 are formed on a pair of surfaces of the first capacitor 20a facing each other.

In the first capacitor 20a, dielectric layers and internal electrode layers are laminated alternately. The dielectric layers are made of any material and are made of, for example, dielectric materials, such as calcium titanate, strontium titanate, barium titanate, and these mixture. Each of the dielectric layers has any thickness, but normally has a thickness of 1 µm to hundreds of µm. In the present embodiment, preferably, each of the dielectric layers has 1.0-5.0 µm.

The internal electrode layers contain a conductive material. The conductive material contained in the internal electrode layers is not limited, but can be a comparatively inexpensive base metal if the dielectric layers are made of reduction resistance material. Preferably, the base metal used for the internal electrode layers is Ni or a Ni alloy. Preferably, the Ni alloy is an alloy of Ni and one or more elements selected from Mn, Cr, Co, and Al. Preferably, the Ni content of this alloy is 95 wt % or more. Incidentally, Ni or the Ni alloy may contain various minor components, such as P, at about 0.1 wt % or less. The internal electrode layers may be formed using a commercially available electrode paste. The thickness of each of the internal electrode layers is appropriately determined based on purpose or so. The internal electrode layers may be made of a conductive material excluding metal.

The internal electrode layers laminated inside the first capacitor 20a are divided into those connected to the first terminal electrode 21 and those connected to the second terminal electrode 22. The potential difference applied to the first terminal electrode 21 and the second terminal electrode 22 is applied to the dielectric layers of the first capacitor 20a via the internal electrode layers.

The first terminal electrode 21 and the second terminal electrode 22 are also made of any material and are normally made of copper, copper alloy, nickel, nickel alloy, etc., but can also be made of silver, an alloy of silver and palladium, etc. The first terminal electrode 21 and the second terminal electrode 22 may also have any thickness, but normally have a thickness of about 10-50 µm. Incidentally, at least one metal film selected from Ni, Cu, Sn, etc. may be formed on the surfaces of the first and second terminal electrodes 21 and 22.

As shown in FIG. 3, the second capacitor 20b includes a third terminal electrode 23 and a fourth terminal electrode 24. The third terminal electrode 23 is disposed on an end surface of the second capacitor 20b facing the negative side in the Y-axis direction, and the fourth terminal electrode 24 is disposed on an end surface of the second capacitor 20b facing the positive side in the Y-axis direction. That is, the third terminal electrode 23 and the fourth terminal electrode 24 are formed on a pair of surfaces of the second capacitor 20b facing each other.

The shape, structure, and material of the second capacitor 20b are respectively similar to those of the first capacitor 20a mentioned above.

The shape and size of the first capacitor 20a and the second capacitor 20b are appropriately determined based on purpose and application. For example, each of the first capacitor 20a and the second capacitor 20b has a height of 1.0-6.5 mm (length in the Y-axis shown in FIG. 3), a width of 0.5-5.5 mm (length in the Z-axis shown in FIG. 3), and a thickness of 0.3-3.5 mm (length in the X-axis shown in FIG. 3). A plurality of capacitors 20a and 20b may have mutually different sizes and shapes. Incidentally, the lamination direction of the internal electrode layers and the dielectric layers inside the first capacitor 20a and the second capacitor 20b is not limited and may be the X-axis direction or the Z-axis direction.

Figure 4:
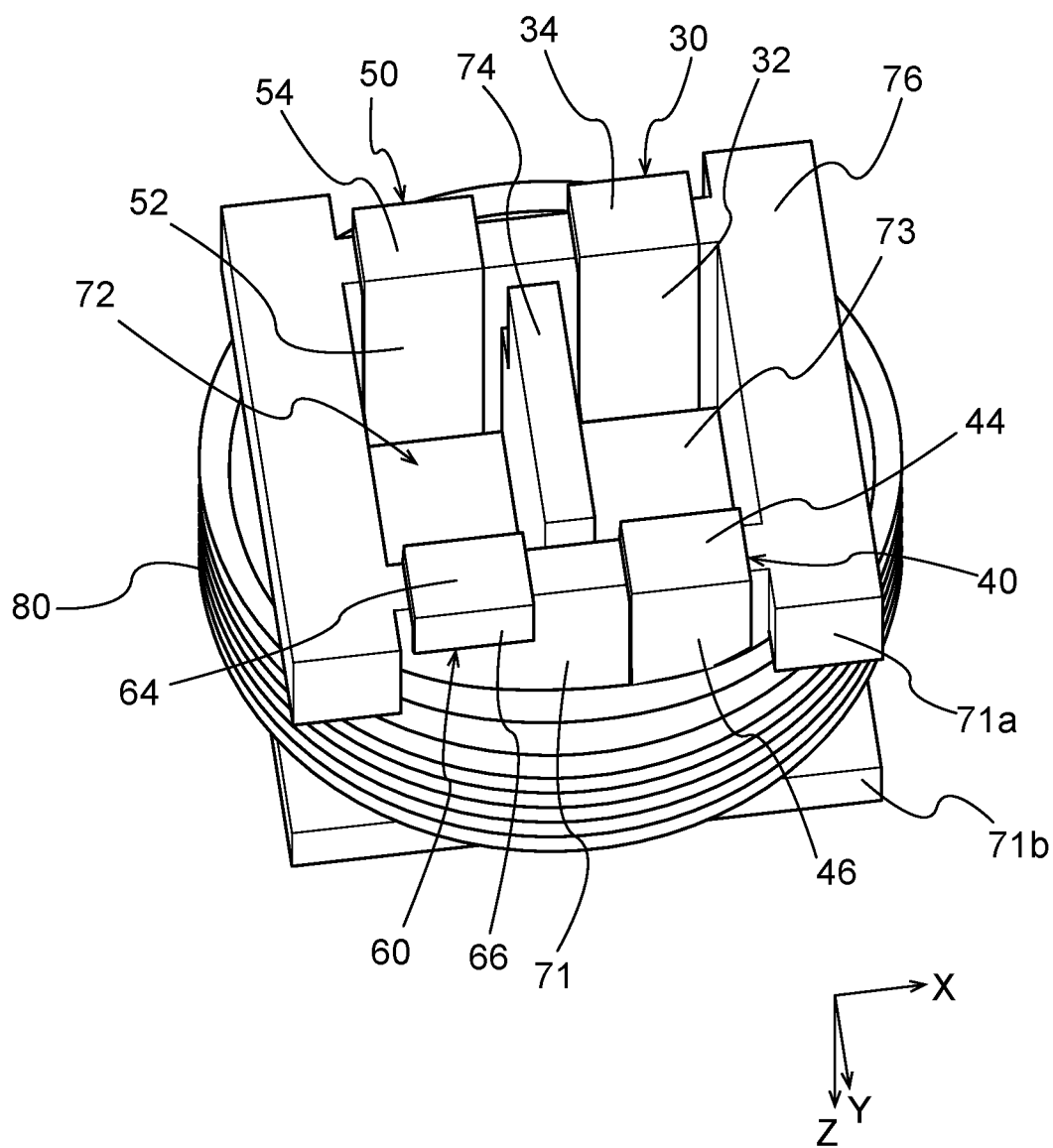
FIG. 4 is a schematic perspective view of the electronic device shown in FIG. 1 from diagonally below and illustrates a state where capacitors included in the electronic device are not displayed.

FIG. 4 is a schematic perspective view of the electronic device 10 from diagonally below. In FIG. 4, however, the first capacitor 20a and the second capacitor 20b are not displayed. As shown in FIG. 4, the case 70 includes an accommodation recess 72 for accommodating the first capacitor 20a and the second capacitor 20b.

The accommodation recess 72 is surrounded by an upper wall surface 73 on the positive side in the Z-axis direction and four inner surfaces on both sides in the X-axis direction and both sides in the Y-axis direction and forms a substantially rectangular parallelepiped space opening to the negative side in the Z-axis direction. A partition wall 74 for dividing the accommodation recess 72 and partitioning the first capacitor 20a and the second capacitor 20b in the accommodation recess 72 is disposed at a central part of the accommodation recess 72 in the X-axis direction.

The partition wall 74 substantially halves the accommodation recess 72. The first capacitor 20a is accommodated into one side of the partition wall 74 (negative side in the X-axis direction), and the second capacitor 20b is accommodated into the other side of the partition wall 74 (positive side in the X-axis direction). The case 70 includes an open edge surface 76 disposed around the opening of the accommodation recess 72. The open edge surface 76 is a surface facing the negative side in the Z-axis direction and constitutes a mounting-side bottom surface, which is an end surface of the case 70 on the negative side in the Z-axis direction.

The open edge surface 76 surrounds the opening of the accommodation recess 72. The first to fourth conductive terminals 30, 40, 50, and 60 are partly arranged on the open edge surface 76.

Figure 5:
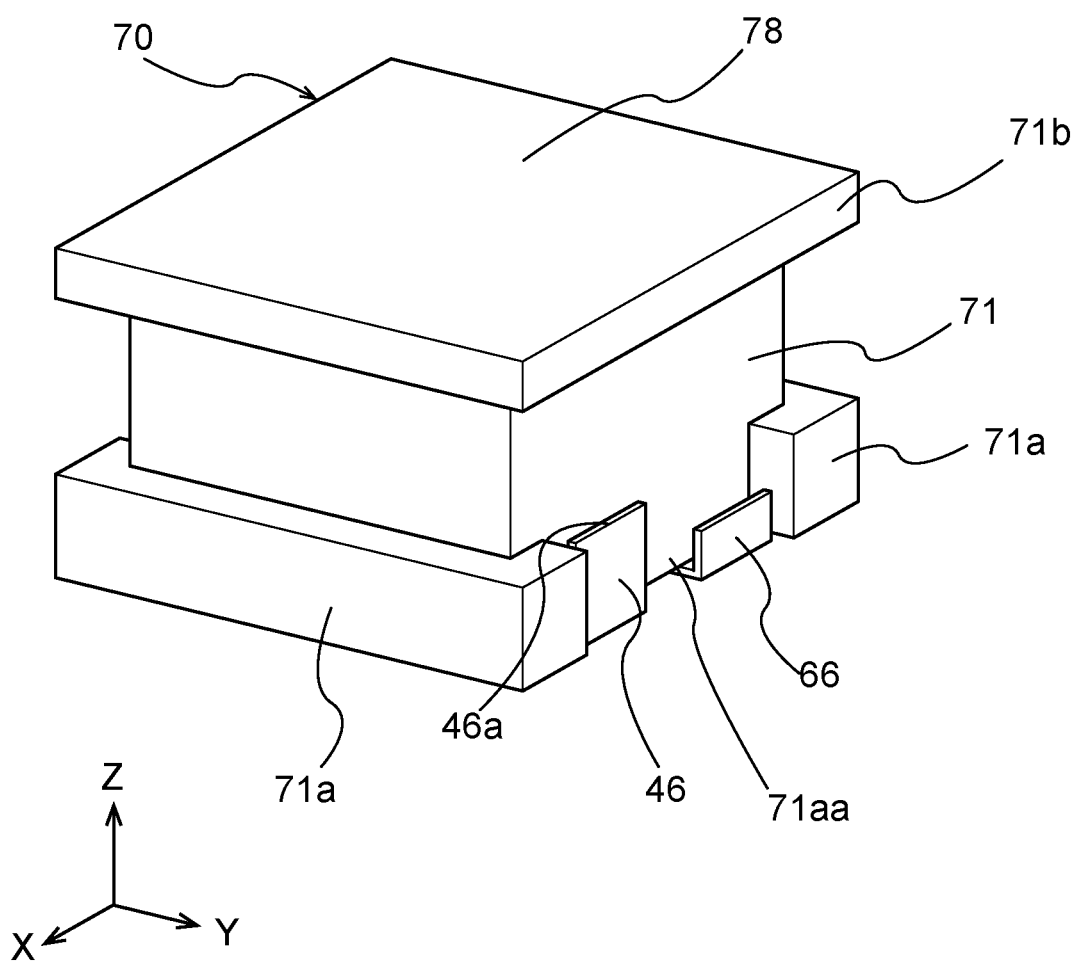
FIG. 5 is a schematic perspective view of the electronic device shown in FIG. 1 from diagonally above and illustrates a state where a coil included in the electronic device is not displayed.

FIG. 5 is a conceptual view of the electronic device 10 shown in FIG. 1 illustrating a state where the coil 80 included in the electronic device 10 is not displayed. As shown in FIG. 5, the case 70 includes an outer wall 71 having a substantially rectangular shape in the Z-axis direction. As shown in FIG. 1, the coil 80 is disposed outside the accommodation recess 72 for accommodating the first capacitor 20a and the second capacitor 20b and is disposed around the outer wall 71 shown in FIG. 5 (see FIG. 3).

The coil 80 shown in FIG. 1 is separated from the first capacitor 20a and the second capacitor 20b shown in FIG. 3 by the outer wall 71, which is a part of the case 70. In the electronic device 10, the coil 80 is made of a wire winding around the outer wall 71 (see FIG. 5) of the case 70. However, the coil 80 included in the electronic device 10 is not limited to the wire winding around the outer wall 71 and may be a chip inductor mentioned below or other types of coil disposed outside the case 70.

As shown in FIG. 5, the case 70 includes a first protrusion portion 71a formed closer to the open edge surface 76 (see FIG. 4) than the coil 80 in the outer wall 71 and a second protrusion portion 71b formed farther from the open edge surface 76 than the coil 80 in the outer wall 71. Compared to other portions of the outer wall 71, the first protrusion portion 71a and the second protrusion portion 71b protrude outward in the radial direction of the coil 80 in the outer wall 71.

The first protrusion portion 71a is formed at the end of the case 70 on the negative side in the Z-axis direction, and the lower end of the first protrusion portion 71a continues to the open edge surface 76. As shown in FIG. 5, the first protrusion portion 71a is formed along the circumference direction of the outer wall 71, but is not continuous in the circumference direction.

Figure 6:
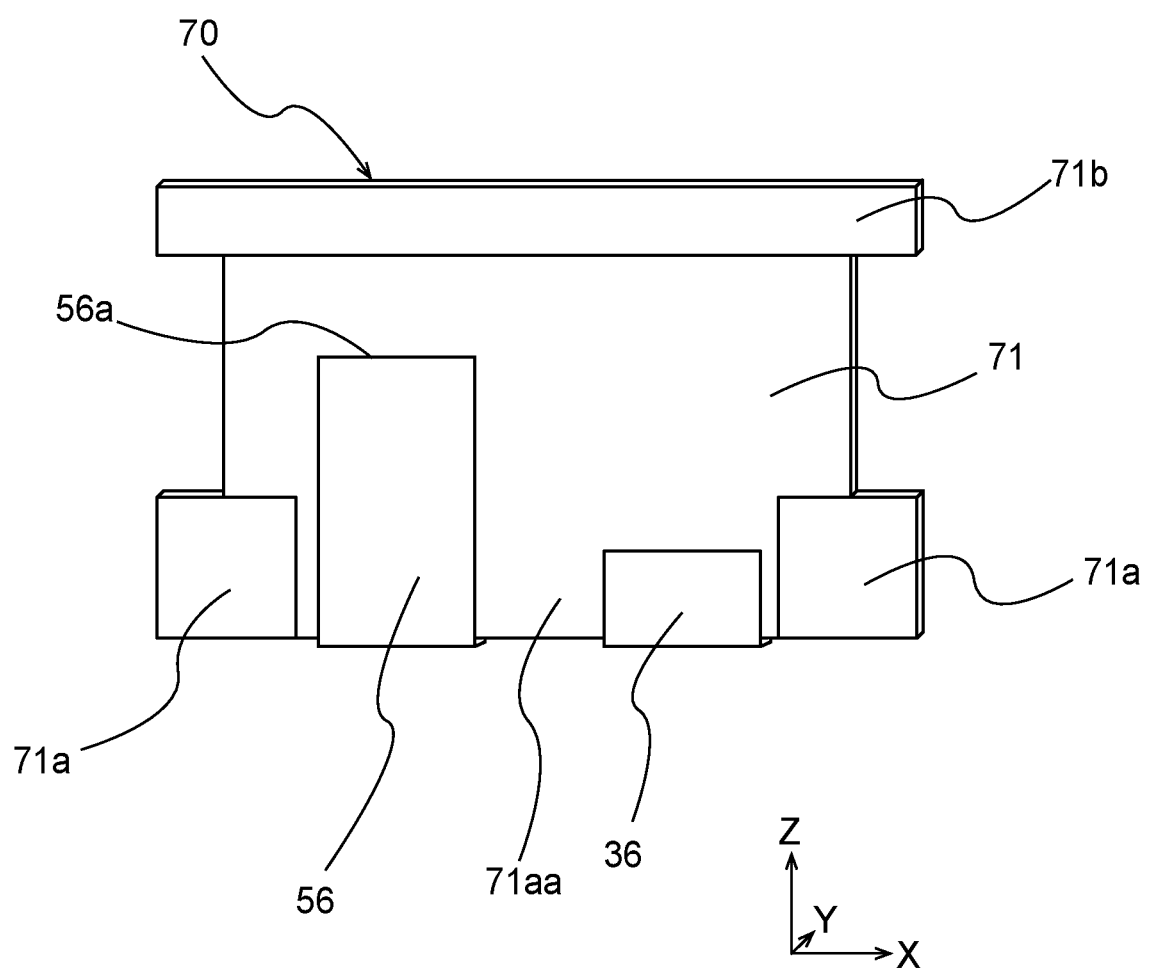
FIG. 6 is a side view of the electronic device shown in FIG. 1 and illustrates a state where a coil included in the electronic device is not displayed.

That is, as shown in FIG. 5 and FIG. 6, the first protrusion portion 71a includes disconnection portions 71aa not protruding on the side surface on the positive side in the Y-axis direction and the side surface on the negative side in the Y-axis direction. The first to fourth conductive terminals 30, 40, 50, and 60 are partly arranged in the disconnection portions 71aa.

As shown in FIG. 5, the second protrusion portion 71b is formed at the end of the case 70 on the positive side in the Z-axis direction, and the upper end of the second protrusion portion 71b continues to an upper surface 78 of the case 70. Unlike the first protrusion portion 71a, the second protrusion portion 71b is formed continuously in the circumference direction of the outer wall 71. As with the first protrusion portion 71a, however, the second protrusion portion 71b may be formed intermittently in the circumference direction.

As shown in FIG. 1, the coil 80 is disposed between the first protrusion portion 71a and the second protrusion portion 71b of the case 70a. The first protrusion portion 71a and the second protrusion portion 71b regulate a position of the coil 80 in the Z-axis direction and support the fixation of the coil 80 to the case 70.

The case 70 is made of any material, but is preferably made of an insulating material, such as ceramic, glass, and synthetic resin. In particular, the case 70 is made of a resin material with favorable heat resistance. The coil 80 is made of any conductive wire, such as a covered wire of single wire, stranded wire, or the like.

Figure 7:
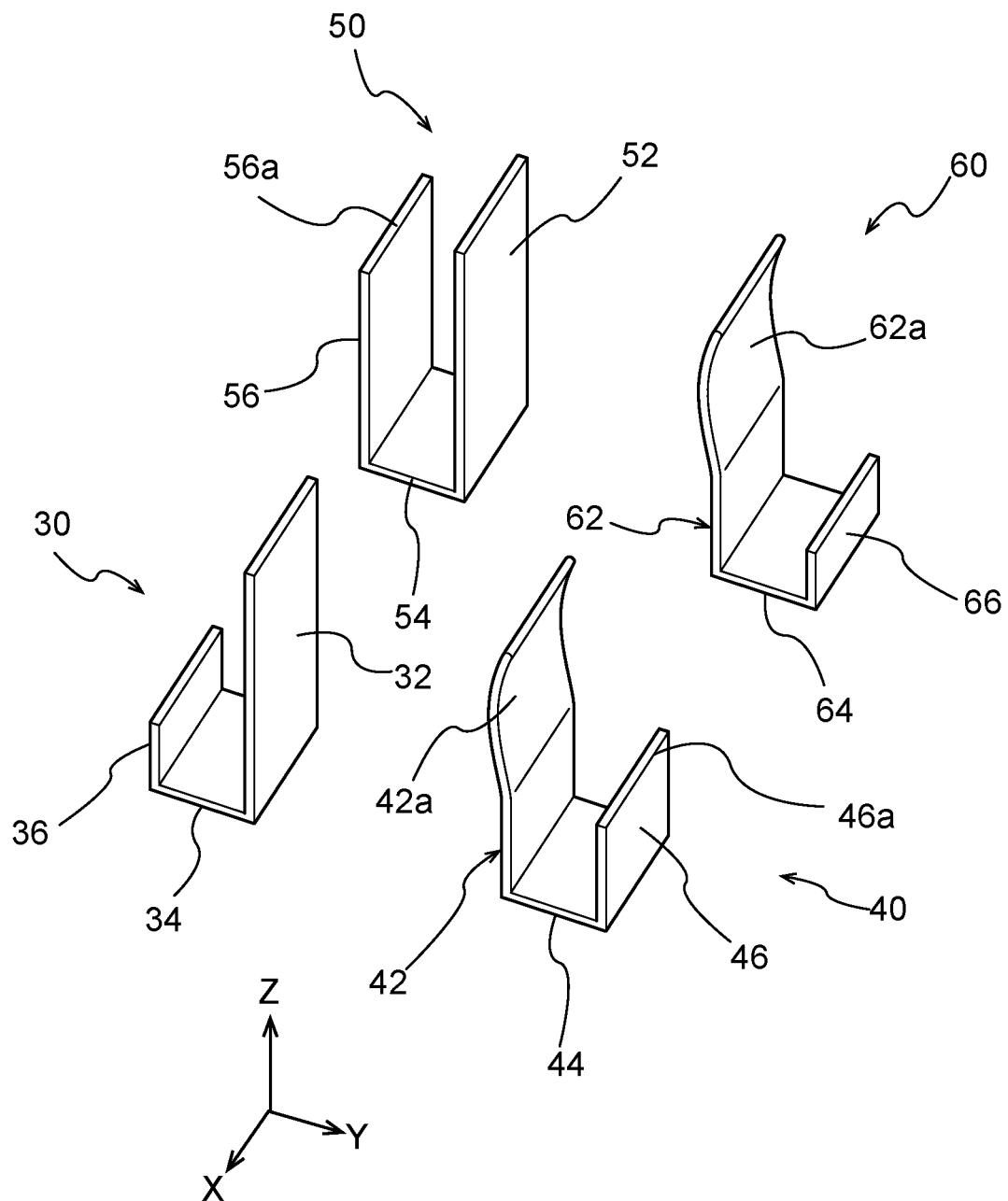
FIG. 7 is a schematic perspective view of first to fourth conductive terminals included in the electronic device shown in FIG. 1.

FIG. 7 is a schematic perspective view of the first to fourth conductive terminals 30, 40, 50, and 60 included in the electronic device 10. As shown in FIG. 7, the first conductive terminal 30 includes an inner electrode portion 32, an open edge electrode portion 34, and a side electrode portion 36. The first conductive terminal 30 has a bent L or U shape. The first conductive terminal 30 is bent by about 90 degrees at the connection part between the inner electrode portion 32 and the open edge electrode portion 34 and is bent by about 90 degrees at the connection part between the open edge electrode portion 34 and the side electrode portion 36. Each of the inner electrode portion 32, the open edge electrode portion 34, and the side electrode portion 36 has a rectangular flat plate shape.

As shown in FIG. 3, the first conductive terminal 30 is connected to the first terminal electrode 21 of the first capacitor 20a. As shown in FIG. 4, the inner electrode portion 32 of the first conductive terminal 30 is inserted in the accommodation recess 72. As shown in FIG. 2, the first terminal electrode 21 of the first capacitor 20a accommodated into the accommodation recess 72 contacts and conducts with the inner electrode portion 32 of the first conductive terminal 30.

As shown in FIG. 4, the open edge electrode portion 34, which is a part of the first conductive terminal 30, is disposed on the open edge surface 76 of the case 70. The open edge electrode portion 34 extends along the open edge surface 76 and is substantially parallel to the open edge surface 76.

As shown in FIG. 6, the side electrode portion 36 of the first conductive terminal 30 is disposed on the outer wall 71 of the case 70 and is particularly disposed in the disconnection portion 71aa of the first protrusion portion 71a. As shown in FIG. 7, the side electrode portion 36 of the first conductive terminal 30 is shorter than a side electrode portion 46 of the second conductive terminal 40 mentioned below. Thus, the upper end of the side electrode portion 36 shown in FIG. 6 is not connected to the coil 80 and is separated from the coil 80.

As shown in FIG. 7, the second conductive terminal 40 includes an inner electrode portion 42, an open edge electrode portion 44, and a side electrode portion 46. The second conductive terminal 40 has a bent L or U shape. As with the first conductive terminal 30, the second conductive terminal 40 is bent by about 90 degrees at the connection part between the inner electrode portion 42 and the open edge electrode portion 44 and is bent by about 90 degrees at the connection part between the open edge electrode portion 44 and the side electrode portion 46. Each of the open edge electrode portion 44 and the side electrode portion 46 of the second conductive terminal 40 has a rectangular flat plate shape.

As shown in FIG. 7, the inner electrode portion 42 of the second conductive terminal 40 includes a curved portion 42a curved from the base on the negative side in the Z-axis direction toward the tip on the positive side in the Z-axis direction. As shown in FIG. 3, the second conductive terminal 40 is connected to the second terminal electrode 22 of the first capacitor 20a. As shown in FIG. 2 and FIG. 3, the inner electrode portion 42 of the second conductive terminal 40 is inserted in the accommodation recess 72, and the second terminal electrode 22 of the first capacitor 20a accommodated into the accommodation recess 72 contacts and conducts with the inner electrode portion 42 of the second conductive terminal 40. Here, as shown in FIG. 3, the curved portion 42a of the inner electrode portion 42 is elastically deformed by being sandwiched by the inner surface of the accommodation recess 72 and the second terminal electrode 22 and is thereby elastically contacted with the second terminal electrode 22.

As shown in FIG. 4, the open edge electrode portion 44, which is a part of the second conductive terminal 40, is disposed on the open edge surface 76 of the case 70. The open edge electrode portion 44 extends along the open edge surface 76 and is substantially parallel to the open edge surface 76.

As shown in FIG. 5, the side electrode portion 56 of the second conductive terminal 40 is disposed on the outer wall 71 of the case 70 and is partly disposed on the disconnection portion 71aa of the first protrusion portion 71a. As shown in FIG. 7, the side electrode portion 46 of the second conductive terminal 40 is longer than the side electrode portion 36 of the first conductive terminal 30 mentioned above. An upper end 46a of the side electrode portion 46 of the second conductive terminal 40 shown in FIG. 5 is connected to one end of the coil 80. The second conductive terminal 40 and one end of the coil 80 are connected by any method, such as welding, pressure welding, soldering, and screwing.

As shown in FIG. 7, the third conductive terminal 50 includes an inner electrode portion 52, an open edge electrode portion 54, and a side electrode portion 56. The third conductive terminal 50 has a bent L or U shape. As with the first conductive terminal 30, the third conductive terminal 50 is bent by about 90 degrees at the connection part between the inner electrode portion 52 and the open edge electrode portion 54 and is bent by about 90 degrees at the connection part between the open edge electrode portion 54 and the side electrode portion 56. Each of the inner electrode portion 52, the open edge electrode portion 54, and the side electrode portion 56 has a rectangular flat plate shape.

As shown in FIG. 3, the third conductive terminal 50 is connected to the third terminal electrode 23 of the second capacitor 20b. As shown in FIG. 4, the inner electrode portion 52 of the third conductive terminal 50 is inserted in the accommodation recess 72. As shown in FIG. 2, the third terminal electrode 23 of the second capacitor 20b accommodated into the accommodation recess 72 contacts and conducts with the inner electrode portion 52 of the third conductive terminal 50.

As with the first and second conductive terminals 30 and 40, as shown in FIG. 4, the open edge electrode portion 54, which is a part of the third conductive terminal 50, is disposed on the open edge surface 76 of the case 70. The open edge electrode portion 54 extends along the open edge surface 76 and is substantially parallel to the open edge surface 76.

As shown in FIG. 6, the side electrode portion 56 of the third conductive terminal 50 is disposed on the outer wall 71 of the case 70 and is partly disposed in the disconnection portion 71aa of the first protrusion portion 71a. As shown in FIG. 7, the side electrode portion 56 of the third conductive terminal 50 is longer than a side electrode portion 66 of the fourth conductive terminal 60 mentioned below. An upper end 56a of the side electrode portion 56 of the third conductive terminal 50 shown in FIG. 6 is connected to the other end (the opposite end to the end to which the second conductive terminal 40 is connected) of the coil 80. The third conductive terminal 50 and the other end of the coil 80 are connected similarly to the second conductive terminal 40 and one end of the coil 80.

As shown in FIG. 7, the fourth conductive terminal 60 includes an inner electrode portion 62, an open edge electrode portion 64, and a side electrode portion 66. The fourth conductive terminal 60 has a bent L or U shape. As with the second conductive terminal 40, the fourth conductive terminal 60 is bent by about 90 degrees at the connection part between the inner electrode portion 62 and the open edge electrode portion 64 and is bent by about 90 degrees at the connection part between the open edge electrode portion 64 and the side electrode portion 66. Each of the open edge electrode portion 64 and the side electrode portion 66 of the fourth conductive terminal 60 has a rectangular flat plate shape.

As shown in FIG. 7, as with the inner electrode portion 42 of the second conductive terminal 40, the inner electrode portion 62 of the fourth conductive terminal 60 includes a curved portion 62a curved from the base on the negative side in the Z-axis direction toward the tip on the positive side in the Z-axis direction. As shown in FIG. 3, the second conductive terminal 40 is connected to the fourth terminal electrode 24 of the second capacitor 20b. As shown in FIG. 2 and FIG. 3, the inner electrode portion 62 of the fourth conductive terminal 60 is inserted in the accommodation recess 72, and the fourth terminal electrode 24 of the second capacitor 20b accommodated into the accommodation recess 72 contacts and conducts with the inner electrode portion 62 of the fourth conductive terminal 60. Here, as shown in FIG. 3, the curved portion 62a of the inner electrode portion 62 is elastically deformed by being sandwiched by the inner surface of the accommodation recess 72 and the second terminal electrode 22 and is thereby elastically contacted with the fourth terminal electrode 24.

As shown in FIG. 4, the open edge electrode portion 64, which is a part of the fourth conductive terminal 60, is disposed on the open edge surface 76 of the case 70. The open edge electrode portion 64 extends along the open edge surface 76 and is substantially parallel to the open edge surface 76.

As shown in FIG. 5, the side electrode portion 66 of the fourth conductive terminal 60 is disposed on the outer wall 71 of the case 70 and is particularly disposed in the disconnection portion 71aa of the first protrusion portion 71a. As shown in FIG. 7, as with the side electrode portion 36 of the first conductive terminal 30 mentioned above, the side electrode portion 66 of the fourth conductive terminal 60 is shorter than the side electrode portions 46 and 56 of the second and third conductive terminals 40 and 50. Thus, the upper end of the side electrode portion 66 shown in FIG. 5 is not connected to the coil 80 and is separated from the coil 80.

In the electronic device 10, as understood from comparison between FIG. 1 and FIG. 3, the coil 80 and the first and second capacitors 20a and 20b at least partly overlap with each other in the Y-axis direction, which is a parallel direction to the open edge surface 76. Thus, since the first and second capacitors 20a and 20b are arranged in the hollow space of the coil 80, the downsizing and low profile of the electronic device 10 can be achieved advantageously.

Figure 8:
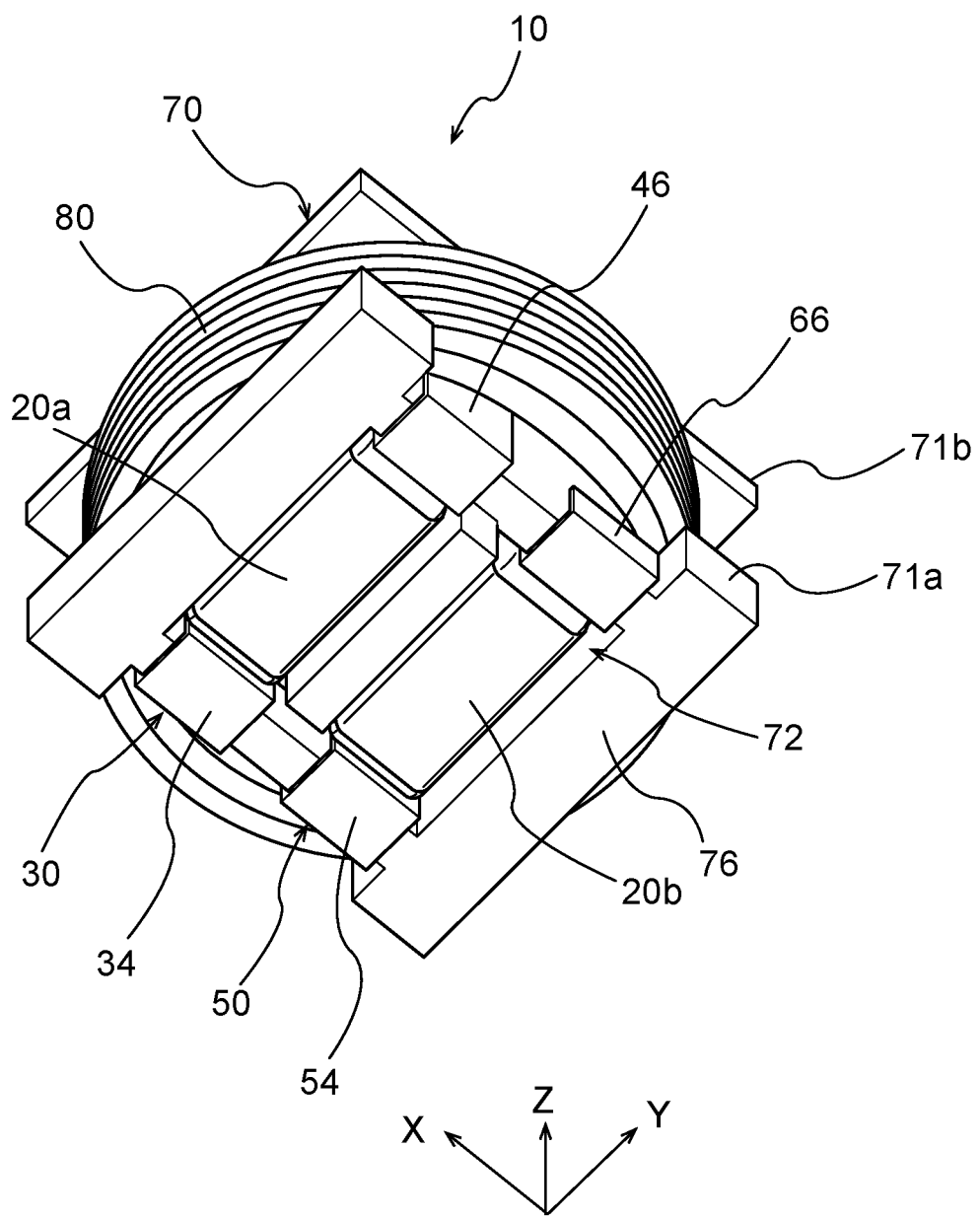
FIG. 8 is a schematic perspective view of the electronic device shown in FIG. 1 from diagonally below.

FIG. 8 is a schematic perspective view of the electronic device 10 shown in FIG. 1 from diagonally below. In the electronic device 10, as shown in FIG. 8, the open edge electrode portions 34, 44, 54, and 64 of the first to fourth conductive terminals 30-60 are exposed to the open edge surface 76 side of the case 70. The electronic device 10 is mounted and used on a mounting board by connecting the open edge electrode portions 34, 44, 54, and 64 to, for example, lands of the mounting board using solder or so.

As shown in FIG. 8, the lower surfaces of the first and second capacitors 20a and 20b of the electronic device 10 are arranged at a position retracted slightly upward from the open surface of the accommodation recess 72. Thus, the first and second capacitors 20a and 20b are prevented from contacting with the board or so at the time of mounting the electronic device 10. However, the lower surfaces of the first and second capacitors 20a and 20b may be arranged at any other position as long as the lower surfaces of the first and second capacitors 20a and 20b are positioned above the lower surfaces of the open edge electrode portions 34, 44, 54, and 64.

As shown in FIG. 8, the opening of the accommodation recess 72 of the electronic device 10 is open, but the electronic device 10 may include a bottom lid partly or completely covering the opening of the accommodation recess 72. In the electronic device 10, the accommodation recess 72 may be filled with resin, and the opening of the accommodation recess 72 may partly or completely be covered with filling resin. Such a resin demonstrates a preventive effect on a short circuit between the conductive part of the accommodation recess 72 and the mounting board and on a falling of the first and second capacitors 20a and 20b due to unexpected impact.

Figure 17A:
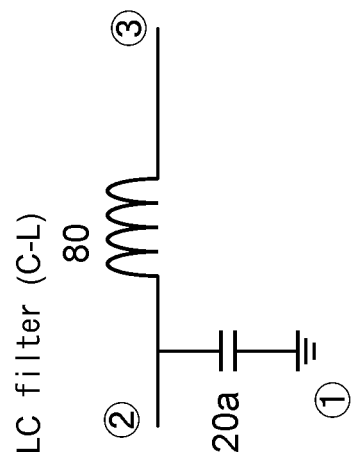
FIG. 17 is a conceptual view illustrating an equivalent circuit diagram formed with one electronic device.
Figure 17B:
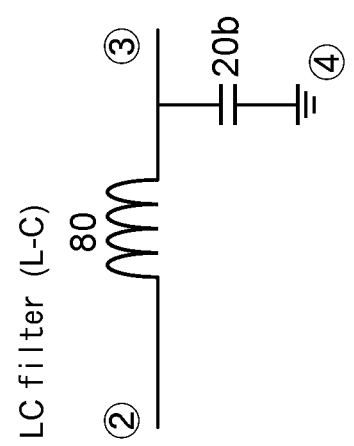
Figure 17C:
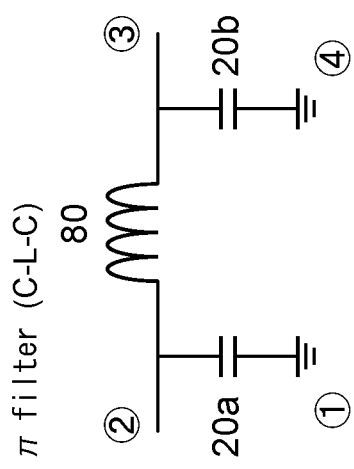

FIG. 17 is a conceptual view illustrating an equivalent circuit diagram formed using the electronic device 10 shown in FIG. 1. As shown in FIG. 17A to FIG. 17C, the electronic device 10 can be used as three kinds of different filters by changing the connection manner to the mounting board or so. In FIG. 17A to FIG. 17C, the circled numbers 1-4 correspond with the open edge electrode portions 34, 44, 54, and 64 of the first to fourth conductive terminals 30-60, respectively.

As shown in FIG. 17A to FIG. 17C, the electronic device 10 can be used as a noise filter by connecting the open edge electrode portions 44 and 54 of the second and third conductive terminals 40 and 50 to the circuit side. Here, as shown in FIG. 17A, when both of the open edge electrode portions 34 and 64 of the first and fourth conductive terminals 30 and 60 are connected to GND, the electronic device 10 can be used as a π filter (C-L-C).

Meanwhile, as shown in FIG. 17B, when only the open edge electrode portion 64 of the fourth conductive terminal 60 is connected to GND, the electronic device 10 can be used as a LC filter (L-C) using the second capacitor 20b. As shown in FIG. 17C, when only the open edge electrode portion 34 of the first conductive terminal 30 is connected to GND, the electronic device 10 can be used as a LC filter (C-L) using the first capacitor 20a.

Hereinafter, a method of manufacturing the electronic device 10 is explained.

The first and second capacitors 20a and 20b are manufactured and prepared by a normal method of manufacturing a multilayer ceramic capacitor.

The first to fourth conductive terminals 30-60 are manufactured and prepared as below. That is, a flat metal plate is prepared in the manufacture of the first to fourth conductive terminals 30-60. The flat metal plate is made of any conductive metal material, such as iron, nickel, copper, silver, and these alloy. Then, the metal plate is machined to obtain intermediate members having the shapes of the inner electrode portions 32, 42, 52, and 62, the open edge electrode portions 34, 44, 54, and 64, and the side electrode portions 36, 46, 56, and 66.

Next, a metal film is formed by plating on the surfaces of the intermediate members formed by machining to obtain the first to fourth conductive terminals 30-60. The material of the plating is not limited, but is, for example, Ni, Sn, Cu, etc.

The case 70 is manufactured by, for example, injection molding.

Figure 19:
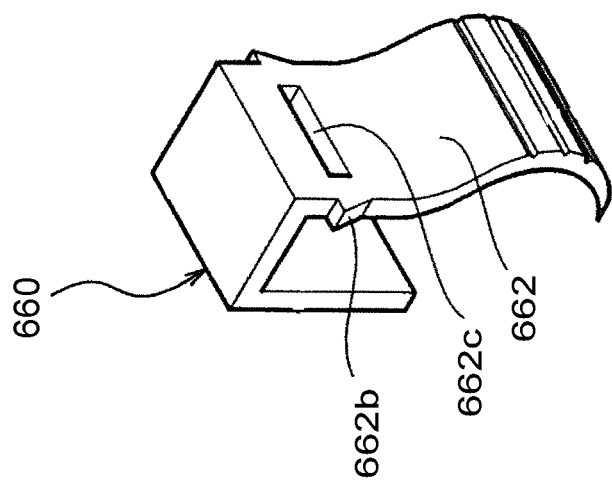
FIG. 19 is a conceptual view of a third conductive terminal according to Third Modification.

Next, the first to fourth conductive terminals 30-60 prepared as mentioned above are attached to the case 70. The first to fourth conductive terminals 30-60 can be fixed to the case 70 using, for example, adhesive agent. As shown in FIG. 19, however, when each of the first to fourth conductive terminals 30-60 includes an engagement piece 662b for engaging with the case 70 (see FIG. 19), the first to fourth conductive terminals 30-60 are fixed to the case 70 by inserting the inner electrode portions 32-62 into the case 70 and engaging the engagement pieces 662b with the case 70.

Next, the coil 80 is formed by winding a wire around the outer wall 71 of the case 70. Then, one end of the coil 80 is connected to the second conductive terminal 40, and the other end of the coil 80 is connected to the third conductive terminal 50.

Finally, the electronic device 10 is obtained by inserting the first and second capacitors 20a and 20b into the accommodation recess 72. Incidentally, the insertion of the first and second capacitors 20a and 20b and the formation of the coil 80 may be in the reverse order of the above.

In the electronic device 10 according to the present embodiment, the assembly of the first and second capacitors 20a and 20b is completed just by accommodating the first and second capacitors 20a and 20b into the accommodation recess 72 from the open surface of the accommodation recess 72 of the case 70. Thus, compared to methods of assembling conventional capacitors requiring soldering for welding a terminal, the method of manufacturing the electronic device 10 is easy and excellent in productivity.

Since the capacitors 20a and 20b and the coil 80 are arranged integrally, the electronic device 10 is advantageous for high-density mounting and simplification of mounting process. Since the coil 80 is separated from the mounting board, other members, such as capacitors, can be arranged between the coil 80 and the mounting board. In particular, since the mounting region of the coil 80 and the mounting region of the capacitors 20a and 20b overlap with each other in the height direction, the electronic device 10 is very advantageous from high-density mounting point of view. Since all of the first to fourth conductive terminals 30-60 are partly arranged on the open edge surface 76, which is the mounting-side bottom surface of the case 70, the electric connection to the electronic device 10 can be changed freely on the mounting board side, and the electronic device 10 can thereby be used as various types of filters. Since the first and second capacitors 20a and 20b are arranged in the accommodation recess 72 and the coil 80 is disposed outside the accommodation recess 72, the insulation between the coil 80 and the capacitors 20a and 20b can favorably be secured.

Since the open edge surface 76 is a mounting-side bottom surface, the electronic device 10 is advantageous from the point of view of downsizing the first to fourth conductive terminals 30-60 and reducing the DC resistance. In the electronic device 10, since the accommodation recess 72 is provided with the partition wall 74, it is possible to favorably secure an insulation distance between the terminal electrodes 21 and 22 of the first capacitor 20a and the terminal electrodes 23 and 24 of the second capacitor 20b. Since the case 70 includes such a partition wall 74, the first to fourth conductive terminals 30-60 and the first and second capacitors 20a and 20b are positioned easily at the time of assembling the electronic device 10.

Second Embodiment

Figure 9:
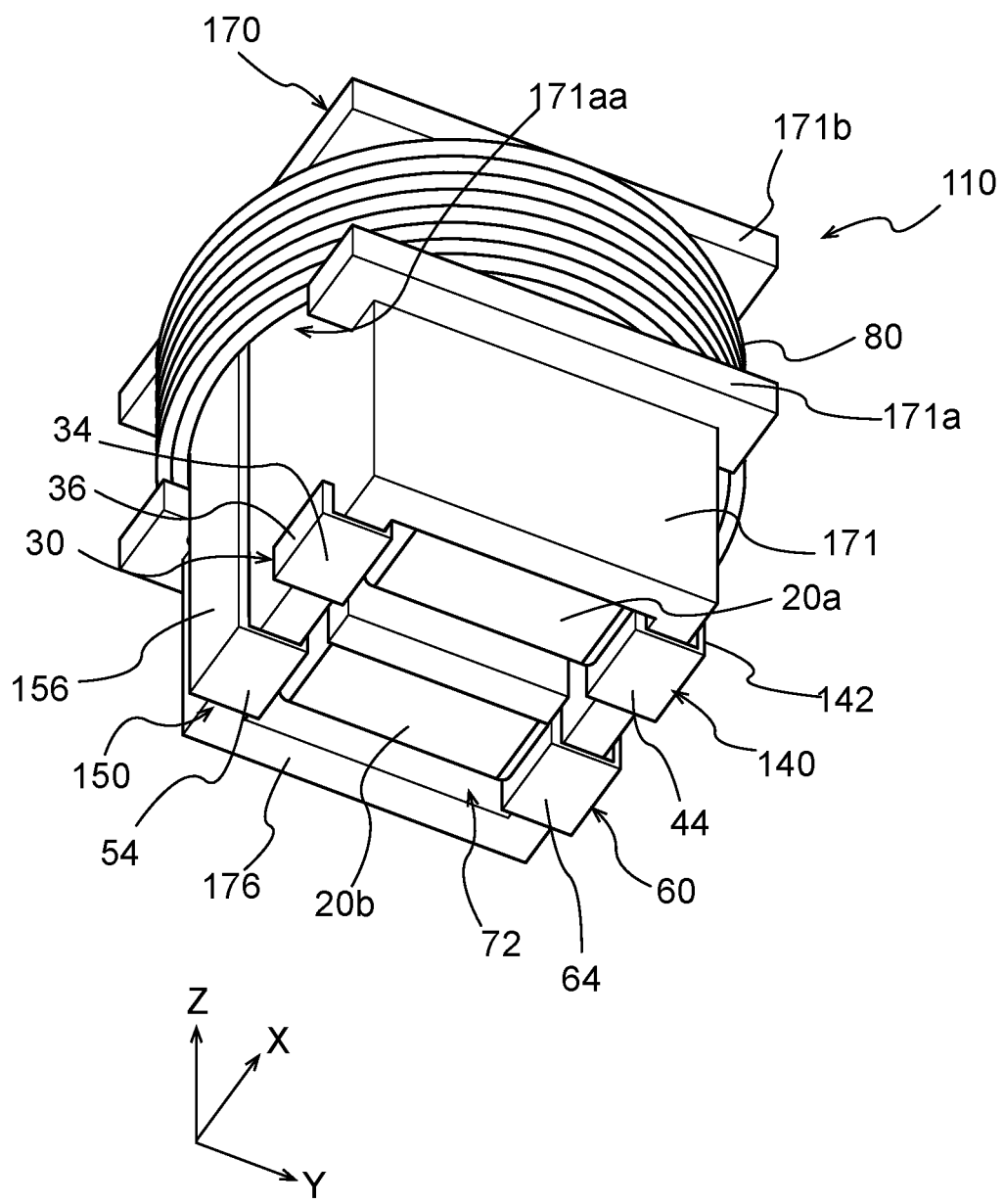
FIG. 9 is a schematic perspective view of an electronic device according to Second Embodiment of the present invention from diagonally above.

FIG. 9 is a schematic perspective view of an electronic device 110 according to Second Embodiment of the present invention from diagonally below. Except for the length of a case 170 in the Z-axis direction and the attachment position of the coil 80, the electronic device 110 according to Second Embodiment is similar to the electronic device 10 according to First Embodiment. The electronic device 110 is mainly explained for the differences with the electronic device 10. The common maters with the electronic device 10 are not explained.

Figure 10:
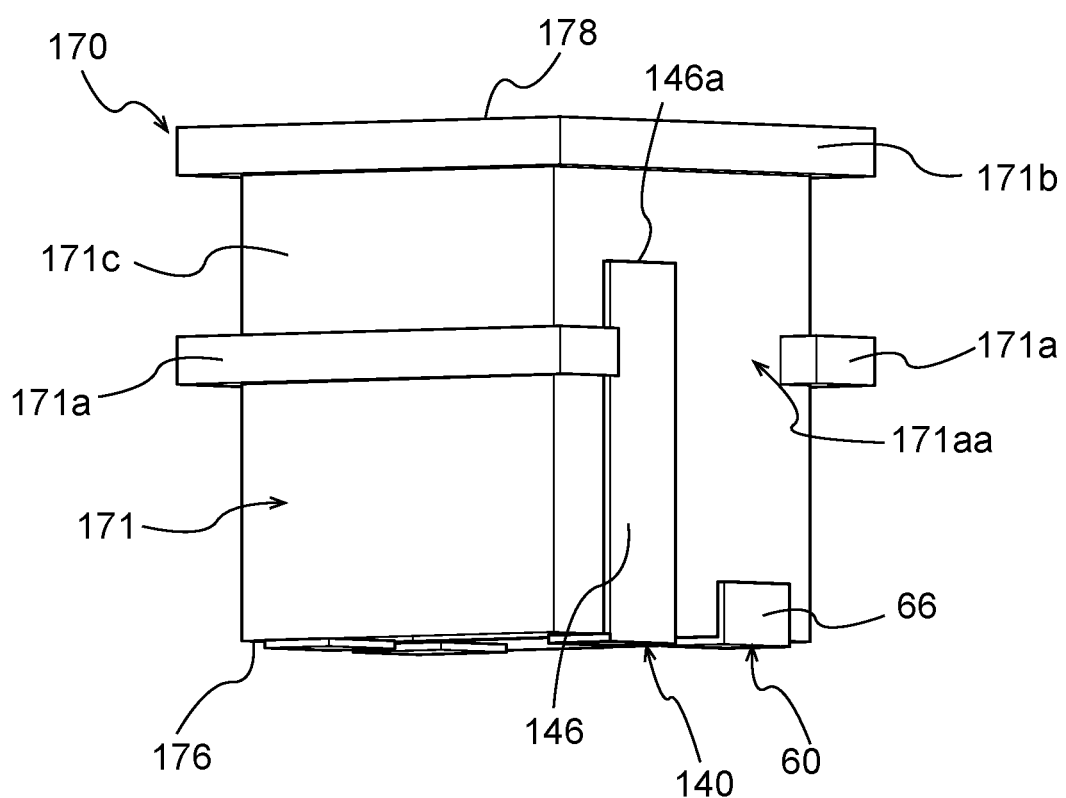
FIG. 10 is a schematic perspective view of the electronic device shown in FIG. 9 from side and illustrates a state where a coil is not displayed.

In the electronic device 110, as shown in FIG. 9, the length of the case 170 in the Z-axis direction is larger than the electronic device 110. FIG. 10 illustrates the electronic device 110 shown in FIG. 9 in a state where the coil 80 is not displayed. As understood from FIG. 9 and FIG. 10, the coil 80 is disposed on an outer-wall upper portion 171c of an outer wall 171 of the case 170. The outer-wall upper portion 171c is closer to an upper surface 178 than to an open edge surface 176, which is a mounting-side bottom surface.

As with the case 70 shown in FIG. 5, the outer wall 171 of the case 170 is provided with a first protrusion portion 171a and a second protrusion portion 171b. In accordance with the position of the coil 80 shown in FIG. 9, however, the formation positions of the first protrusion portion 171a and the second protrusion portion 171b are different from those of the case 70 shown in FIG. 5.

That is, unlike the case 70 shown in FIG. 5, the first protrusion portion 171a is not continuous to the open edge surface 176 and is disposed away from the open edge surface 176 in the Z-axis direction. The distance from the open edge surface 176 to the first protrusion portion 171a in the Z-axis direction is not limited, but can be, for example, a length or more of the first and second capacitors 20a and 20b in the Z-axis direction (height direction). As with the first protrusion portion 71a shown in FIG. 5, the first protrusion portion 171a includes disconnection portions 171aa.

As with the second protrusion portion 71b shown in FIG. 5, the second protrusion portion 171b is formed at the end of the case 170 on the positive side in the Z-axis direction, and the upper end of the second protrusion portion 171b is continuous to the upper surface 178 of the case 170.

Figure 11:
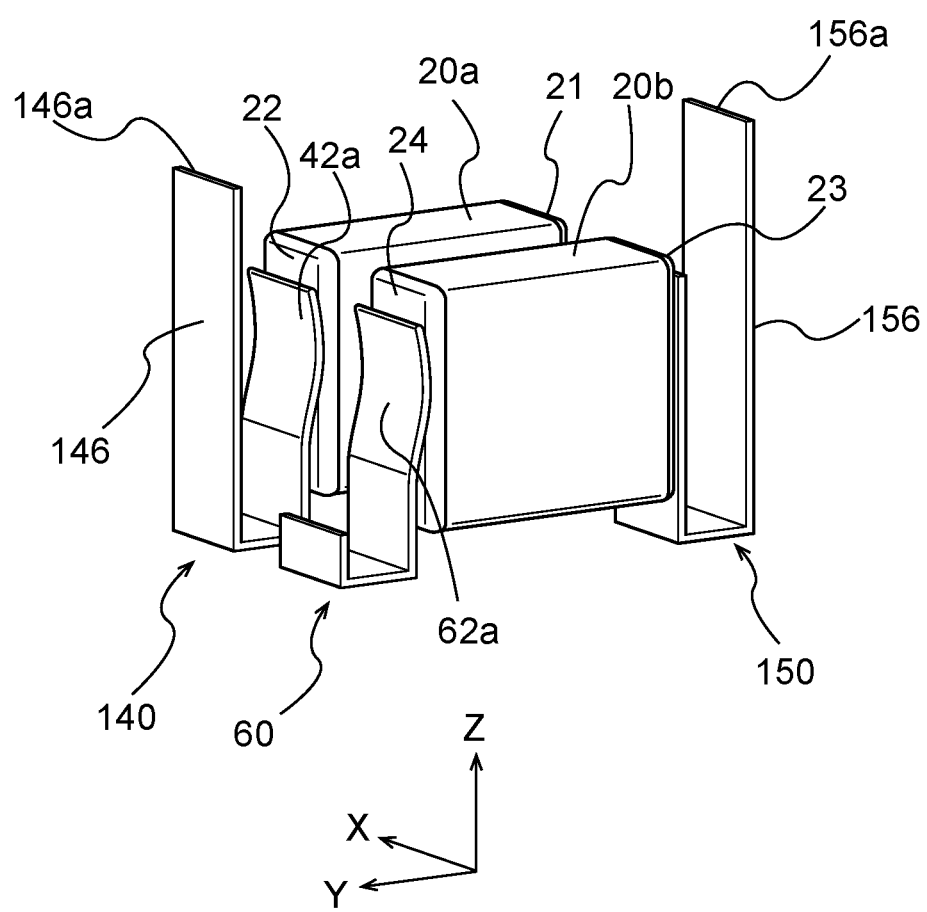
FIG. 11 is a schematic perspective view of the electronic device shown in FIG. 9 illustrating a state where a case and a coil are not displayed.

FIG. 11 is a conceptual view of the electronic device 110 shown in FIG. 9 illustrating a state where the case 170 and the coil 80 are not displayed. As shown in FIG. 11, as with the electronic device 10 shown in FIG. 3, the electronic device 110 includes the first conductive terminal 30 (see FIG. 9), a second conductive terminal 140, a third conductive terminal 150, and the fourth conductive terminal 60.

Among the four conductive terminals 30, 140, 150, and 60 included in the electronic device 110, the first and fourth conductive terminals 30 and 60 are similar to those of the electronic device 10 shown in FIG. 7 or so. As shown in FIG. 9 and FIG. 10, however, the side electrode portions 36 and 66 of the first and fourth conductive terminals 30 and 60 are not arranged on the disconnection portions 171aa because the first protrusion portion 171a is disposed away from the open edge surface 176.

As shown in FIG. 11, the second and third conductive terminals 140 and 150 included in the electronic device 110 include side electrode portions 146 and 156, respectively, whose length in the Z-axis direction is larger than that of the second and third conductive terminals 40 and 50 shown in FIG. 7. Thus, an upper end 146a of the side electrode portion 146 of the second conductive terminal 140 is connected to one end of the coil 80, and an upper end 156a of the side electrode portion 156 of the third conductive terminal 150 is connected to the other end of the coil 80.

As shown in FIG. 9 to FIG. 11, the side electrode portions 146 and 156 of the second and third conductive terminals 140 and 150 are connected to the coil 80 via the disconnection portions 171aa of the outer wall 171 of the case 70. Incidentally, the shapes of the second and third conductive terminals 140 and 150 excluding the side electrode portions 146 and 156 are similar to those of the second and third conductive terminals 40 and 50 shown in FIG. 7.

The accommodation recess 72 of the case 170 shown in FIG. 9 has a similar shape to that of the electronic device 10 shown in FIG. 4 and accommodates the first and second capacitors 20a and 20b. In the electronic device 110, as understood from comparison between FIG. 9 and FIG. 11, the coil 80 and the first and second capacitors 20a and 20b do not overlap with each other in the Y-axis direction, which is parallel to the open edge surface 76. Since the first and second capacitors 20a and 20b are arranged while being shifted in the hollow space of the coil 80, the characteristics of the coil 80 can be improved by disposing any magnetic material in the hollow space of the coil 80.

As for the common matters with the electronic device 10 according to First Embodiment, the electronic device 110 according to Second Embodiment demonstrates similar effects to the electronic device 10.

Third Embodiment

Figure 12:
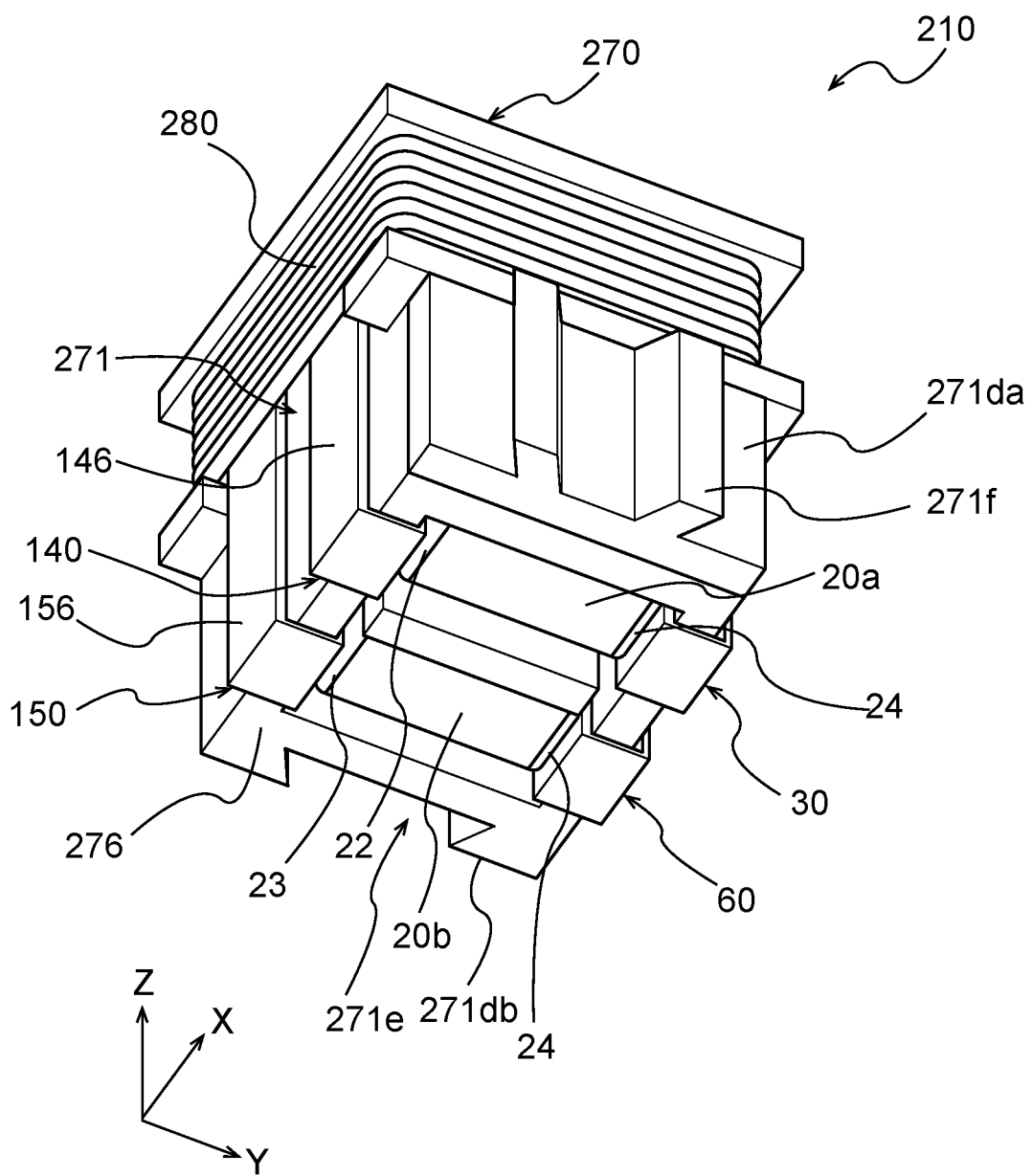
FIG. 12 is a schematic perspective view of an electronic device according to Third Embodiment of the present invention from diagonally below.

FIG. 12 is a schematic perspective view of an electronic device 210 according to Third Embodiment of the present invention from diagonally below. The electronic device 210 according to Third Embodiment is similar to the electronic device 110 according to Second Embodiment except for the outer shapes of a coil 280 and a case 270, the 180-degree rotation of directions of the first capacitor 20a and the first and second conductive terminals 30 and 140, and the like. The electronic device 210 is mainly explained for the differences with the electronic device 110. The common maters with the electronic device 110 are not explained.

As shown in FIG. 12, the coil 280 of the electronic device 210 has a substantially rectangular winding shape. The winding shape of the coil 280 included in the electronic device 210 may be any shape, such as circle, oval, rectangle, and other polygons. The coil 280 may be formed by winding a wire around an outer wall 271 of the case 270. An air core coil may be attached to the outer wall 271 of the case 270.

Figure 13:
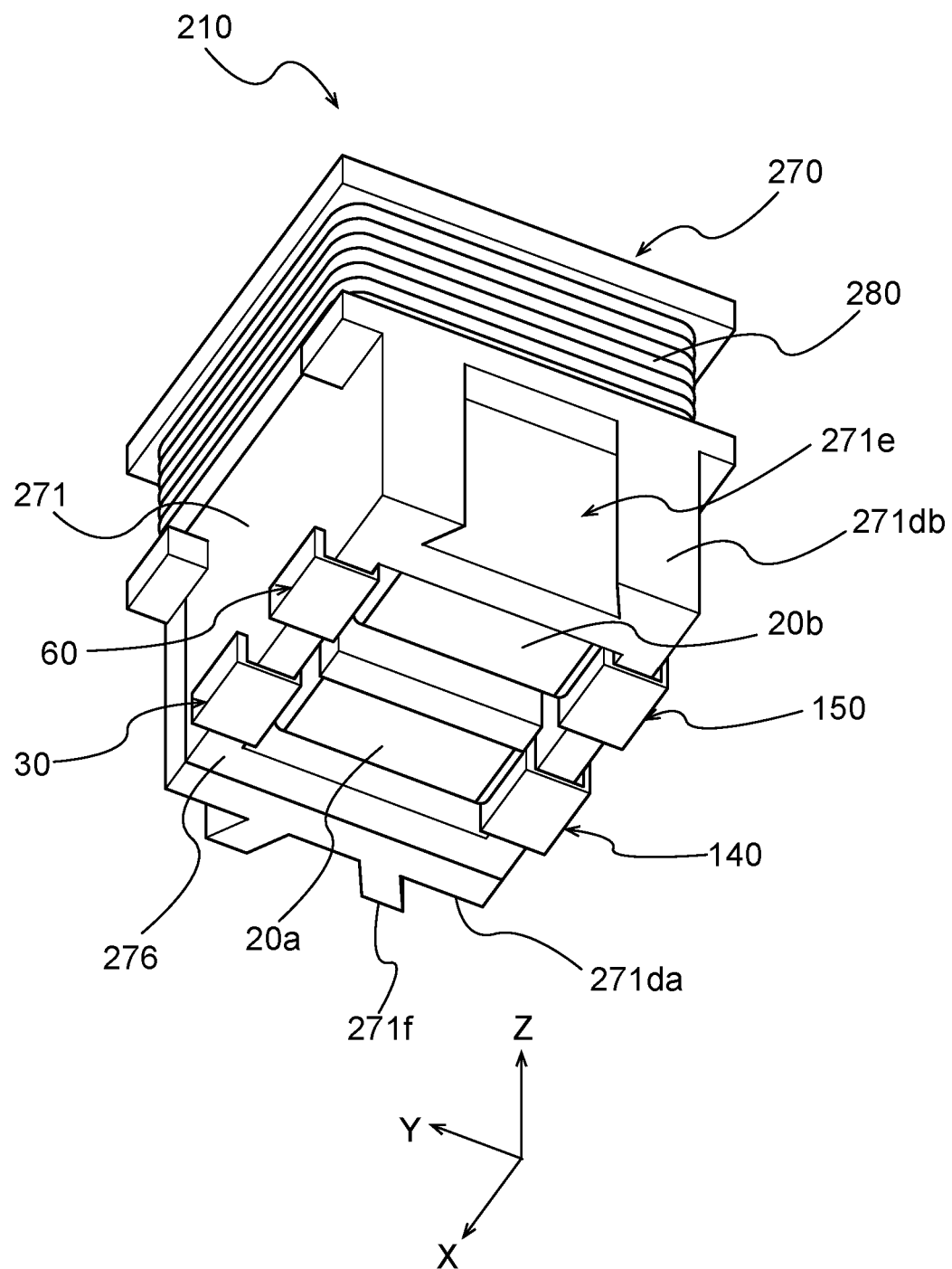
FIG. 13 is a schematic perspective view of the electronic device shown in FIG. 12 in a different direction.

In the electronic device 210, as understood from FIG. 12 and FIG. 13, the first terminal electrode 21 of the first capacitor 20a is directed to the positive side in the Y-axis direction, the second terminal electrode 22 is directed to the negative side in the Y-axis direction, and the first capacitor 20a is disposed on the electronic device 110 shown in FIG. 9 by rotating 180 degrees with respect to a rotation axis parallel to the Z-axis.

In the electronic device 210, as shown in FIG. 12, the second and third conductive terminals 140 and 150 to be connected to the coil 280 are arranged side by side in the same direction. In the electronic device 210, as shown in FIG. 13, the first and fourth conductive terminals 30 and 60 not to be connected to the coil 280 are arranged side by side in the same direction. The first to fourth conductive terminals 30, 140, 150, and 60 may be arranged as the electronic device 210 shown in FIG. 12 or the electronic device 110 shown in FIG. 9.

As shown in FIG. 12, the case 270 includes an engagement protrusion portion 271f and an engagement recess portion 271e formed on the outer wall 271 perpendicular to an open edge surface 276, which is a mounting bottom surface. The engagement protrusion portion 271f and the engagement recess portion 271e are formed on outer-wall lower portions 271da and 271db closer to the open edge surface 276 than the coil 280 on the outer wall 271.

As shown in FIG. 12, the engagement protrusion portion 271f is formed on the outer-wall lower portion 271da perpendicular to the side where the side electrode portions 146 and 156 are arranged. The engagement protrusion portion 271f is formed so as to protrude outward from other portions in the outer-wall lower portion 271da and has an engageable shape with the engagement recess portion 271e.

The engagement recess portion 271e is formed in the outer-wall lower portion 271db on the side facing the engagement protrusion portion 271f. The engagement recess portion 271e has a dovetail groove shape continuing to the open edge surface 276. The engagement protrusion portion 271f can be inserted into the engagement recess portion 271e while sliding from the open edge surface 276 side.

Figure 14:
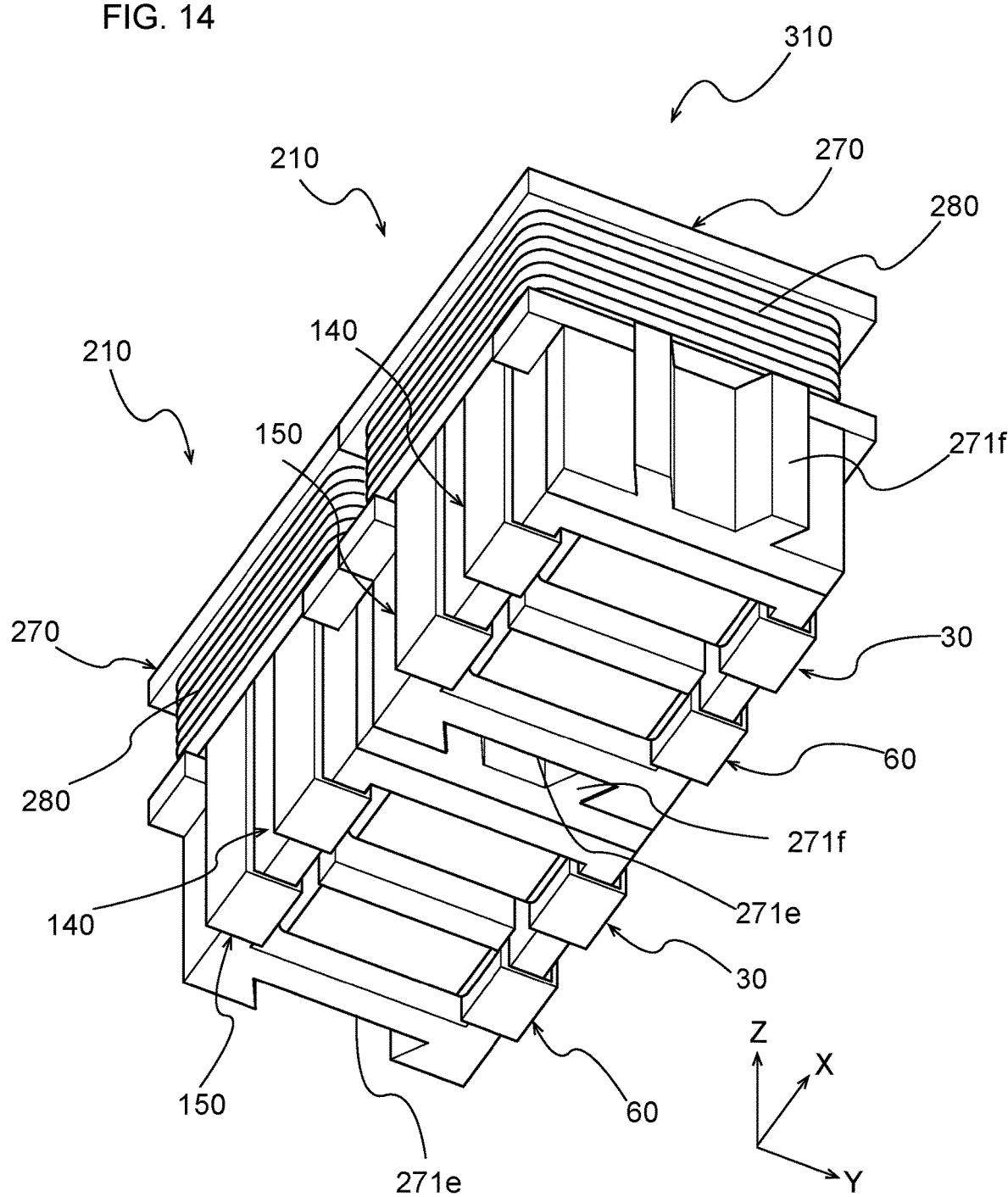
FIG. 14 is a schematic perspective view illustrating a state where two electronic devices shown in FIG. 12 are connected.

FIG. 14 is a schematic perspective view of an electronic device 310 connecting two electronic devices 210 shown in FIG. 12. As shown in FIG. 14, the electronic device 310 can be manufactured by engaging the engagement protrusion portion 271f of one electronic device 210 with the engagement recess portion 271e of the other electronic device 210.

In the electronic device 310, as shown in FIG. 14, the open edge surfaces 276 of the two electronic devices 210 are arranged on the same plane. In the electronic device 310, all of the open edge electrode portions of the first to fourth conductive terminals 30, 140, 150, and 60 of the two electronic devices 210 can easily be connected to the mounting board and mounted on it.

FIG. 18 is a conceptual view illustrating an equivalent circuit diagram formed by using the electronic device 310 shown in FIG. 14. As shown in FIG. 18, the electronic device 310 can be used as an electronic device in which the two electronic devices 210 are connected by electrically connecting the third conductive terminal 150 of one electronic device 210 (see the circled number "3") and the second conductive terminal 140 of the other electronic device 210 (see the circled number "6") via the mounting board. However, the electronic device 310 may include a connection terminal for connecting the third conductive terminal 150 of one electronic device 210 and the second conductive terminal 140 of the other electronic device 210. In the electronic device 310 having such a connection terminal, one electronic device 210 and the other electronic device 210 are electrically connected to each other even if they are not mounted on the mounting board.

Figure 18A:
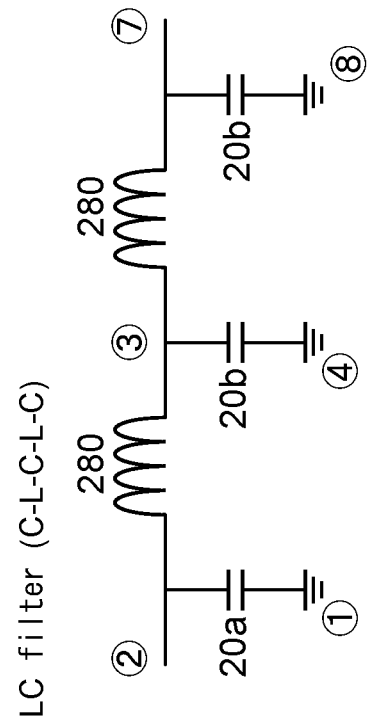
FIG. 18 is a conceptual view illustrating an equivalent circuit diagram formed with two electronic devices.
Figure 18B:
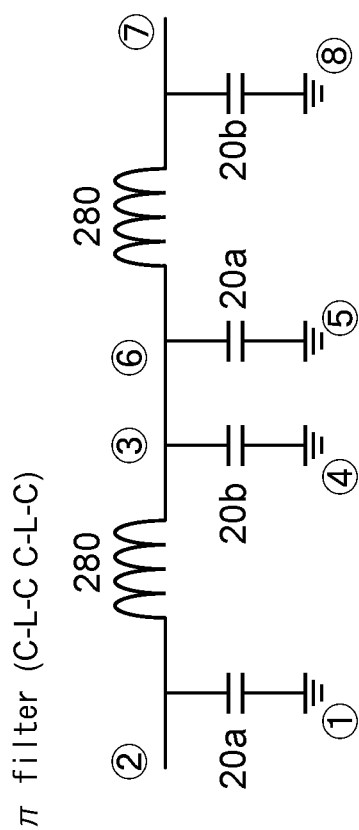

As shown in FIG. 18A and FIG. 18B, the electronic device 310 can be used as filters having different functions by changing the connection manner to the mounting board. In FIG. 18A and FIG. 18B, the circled numbers 1-4 respectively correspond with the open edge electrode portions of the first to fourth conductive terminals 30, 140, 150, and 60 of one electrode device 210 included in the electronic device 310, and the circled numbers 5-8 respectively correspond with the open edge electrode portions of the first to fourth conductive terminals 30, 140, 150, and 60 of the other electrode device 210 included in the electronic device 310.

The electronic device 310 can be used as a 7C filter (C-L-C C-L-C) by being connected via the mounting board as shown in FIG. 18A. In addition, the electronic device 310 can be used as a LC filter (C-L-C-L-C) by being connected via the mounting board as shown in FIG. 18B. In the example of FIG. 18B, the first conductive terminal 30 (the circled number "5" in FIG. 18A) connected to the connection part between one electronic device 210 and the other electronic device 210 is floated electrically.

A plurality of electronic devices 210 is connected easily as shown in FIG. 14 and constitutes one electronic device 310. The connected electronic component 310 is transported at once by a mounting machine or so to a predetermined mounting position on the mounting board. In such electronic devices 210, the mounting process by the mounting machine can thereby be simplified compared to when capacitors, coils, and the like are mounted individually.

Figure 15:
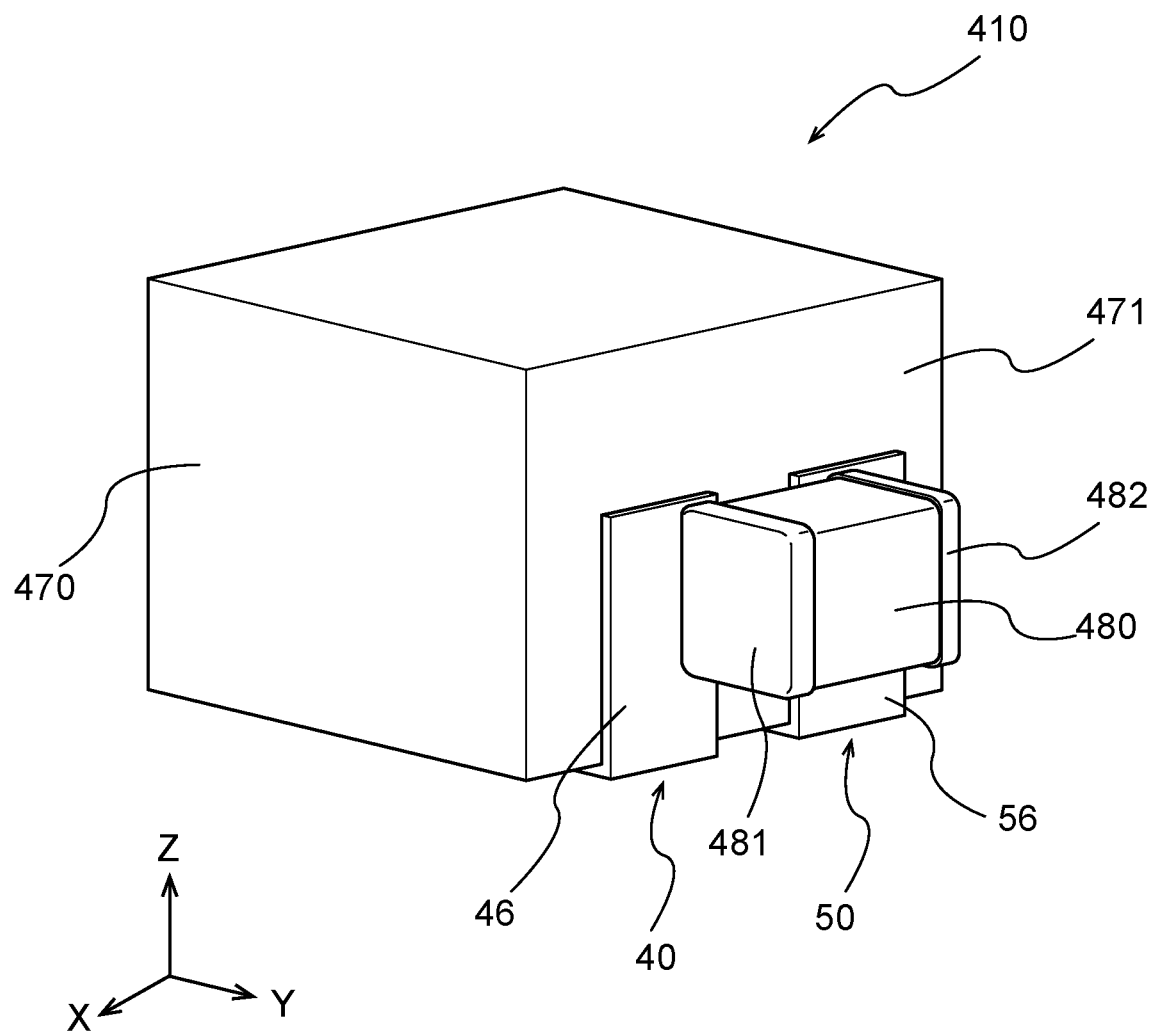
FIG. 15 is a schematic perspective view of an electronic device according to First Modification of the present invention.

Hereinbefore, the present invention is explained with embodiments, but the technical scope of the present invention is not limited to only the embodiments. Needless to say, the present invention includes many other embodiments and modifications. FIG. 15 is a schematic perspective view of an electronic device 410 according to First Modification of the present invention.

As shown in FIG. 15, the electronic device 410 includes a chip coil (chip inductor) 480. The coil 480 is disposed on an outer wall 471 of a case 470. One end of the coil 480 is connected to the side electrode portion 46 of the second conductive terminal 40 via a first terminal 481 of the coil 480. The other end of the coil 480 is connected to the side electrode portion 56 of the third conductive terminal 50 via a second terminal 482 of the coil 480.

Figure 16:
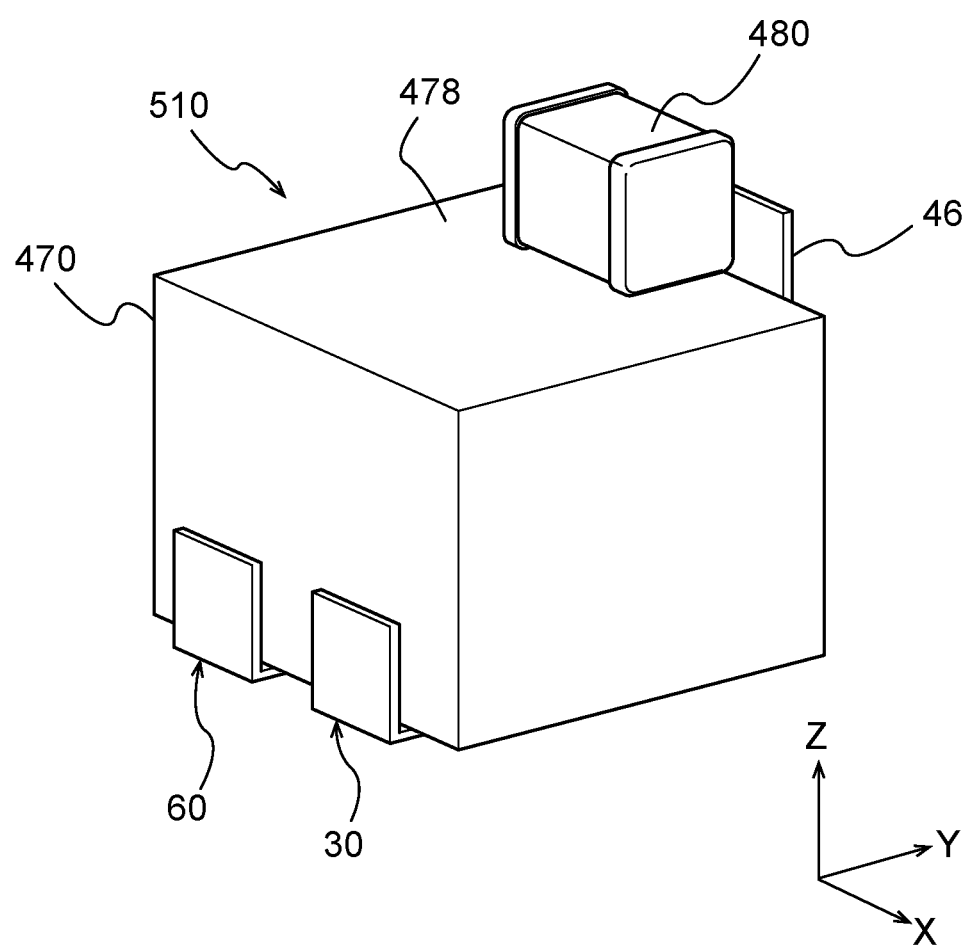
FIG. 16 is a schematic perspective view of an electronic device according to Second Modification of the present invention.

FIG. 16 is a schematic perspective view of an electronic device 510 according to Second Modification of the present invention. As shown in FIG. 16, the chip coil 480 may be disposed on an upper surface 478 of the case 470. The electronic device 510 is similar to the electronic devices 410 in terms of the connection of one end of the coil 480 to the second conductive terminal 40 and the connection of the other end of the coil 480 to the third conductive terminal 50.

As shown in FIG. 15 and FIG. 16, the coil included in the electronic device 410 (510) may be any chip coil, such as multilayer type, thin film type, and winding type. Although not illustrated in FIG. 15 or FIG. 16, as with the cases 70 and 270 shown in FIG. 2, FIG. 12, etc., the case 470 includes an accommodation recess for accommodating the first and second capacitors.

In the above-mentioned embodiments, the number of capacitors included in the electronic device 10 is two, but the number of capacitors included in the electronic device 10 is not limited to two and may be three or more. The electronic device 10 may include a plurality of coils. The electronic device 10 may include a chip component different from capacitors and coils.

In the electronic device 10, as shown in FIG. 7, the second and fourth conductive terminals 40 and 60 include the curved portions 42a and 62a, but all of the first to fourth conductive terminals 30-60 may include curved portions. From the point of view of securely holding the first and second capacitors 20a and 20b, however, it is preferred that at least either one of the first conductive terminal 30 and the second conductive terminal 40 and at least either one of the third conductive terminal 50 and the fourth conductive terminal 60 include a curved portion.

The shapes of the first to fourth conductive terminals 30-60 included in the electronic device 10 are not limited to those shown in FIG. 7 or so. FIG. 19 is a schematic perspective view of a fourth conductive terminal 660 according to Third Modification. As shown in FIG. 19, an inner electrode portion 662 of the fourth conductive terminal 660 includes an engagement piece 662b for engaging with the case 70. The inner electrode portion 662 of the fourth conductive terminal 660 is provided with a through hole 662c for preventing solder for creeping up during mounting.

Instead of the fourth conductive terminal 60 shown in FIG. 7, the fourth conductive terminal 660 as shown in FIG. 19 may be used. The first to third conductive terminals 30-60 may also include an engagement piece 662b and a through hole 662c similar to those of the fourth conductive terminal 660.

DESCRIPTION OF THE REFERENCE NUMERICAL 10, 110, 210, 310, 410, 510 . . . electronic device
20a . . . first capacitor
20b . . . second capacitor
21 . . . first terminal electrode
22 . . . second terminal electrode
23 . . . third terminal electrode
24 . . . fourth terminal electrode
30 . . . first conductive terminal
40, 140 . . . second conductive terminal
50, 150 . . . third conductive terminal
60, 660 . . . fourth conductive terminal
32, 42, 52, 62, 662 . . . inner electrode portion
34, 44, 54, 64 . . . open edge electrode portion
36, 46, 56, 66, 146, 156 . . . side electrode portion
42a, 62a . . . curved portion
46a, 56a, 146a, 156a . . . upper end
662b . . . engagement piece
662c . . . through hole
70, 170, 270, 470 . . . case
71, 171, 271, 471 . . . outer wall
71a, 171a . . . first protrusion portion
71b, 171b . . . second protrusion portion
71aa . . . disconnection portion
171c . . . outer-wall upper portion
271da, 271db . . . outer-wall lower portion
271e . . . engagement recess portion
271f . . . engagement protrusion portion 72 . . . accommodation recess
73 . . . upper wall surface
74 . . . partition wall
76, 176, 276 . . . open edge surface
78, 478 . . . upper surface
80, 280, 480 . . . coil
481 . . . first terminal
482 . . . second terminal

What is claimed is:

1. An electronic device comprising:
a first capacitor including a first terminal electrode and a second terminal electrode;
a second capacitor including a third terminal electrode and a fourth terminal electrode;
a case including an accommodation recess for accommodating the first capacitor and the second capacitor;
a coil separated from the first capacitor and the second capacitor by a part of the case and disposed outside the accommodation recess;
a first conductive terminal connected to the first terminal electrode and partly disposed on a mounting-side bottom surface of the case;
a second conductive terminal connected to one end of the coil and the second terminal electrode and partly disposed on the mounting-side bottom surface;
a third conductive terminal connected to the other end of the coil and the third terminal electrode and partly disposed on the mounting-side bottom surface; and
a fourth conductive terminal connected to the fourth terminal electrode and partly disposed on the mounting-side bottom surface.

2. The electronic device according to claim 1, wherein the case includes an open edge surface disposed around an opening of the accommodation recess, and
the open edge surface is the mounting-side bottom surface.

3. The electronic device according to claim 1, wherein the coil is made of a wire winding an outer wall of the case.

4. The electronic device according to claim 3, wherein the case includes:
a first protrusion portion formed closer to the mounting-side bottom surface than the coil on the outer wall; and
a second protrusion portion formed farther from the mounting-side bottom surface than the coil on the outer wall.

5. The electronic device according to claim 1, wherein the coil and the first and second capacitors at least partly overlap with each other in a parallel direction to the mounting-side bottom surface.

6. The electronic device according to claim 1, wherein the coil and the first and second capacitors do not overlap with each other in a parallel direction to the mounting-side bottom surface.

7. The electronic device according to claim 1, wherein at least either one of the first conductive terminal and the second conductive terminal and at least either one of the third conductive terminal and the fourth conductive terminal include a curved portion for elastically contacting with the first capacitor or the second capacitor in the accommodation recess.

8. The electronic device according to claim 1, wherein at least one of the first to fourth conductive terminals include an engagement piece for engaging with the case.

9. The electronic device according to claim 1, wherein the case includes a partition wall for partitioning the first capacitor and the second capacitor in the accommodation recess.

10. The electronic device according to claim 1, wherein the accommodation recess is filled with resin.

11. The electronic device according to claim 1, wherein the case includes:
an engagement protrusion portion formed on an outer wall perpendicular to the mounting-side bottom surface; and
an engagement recess portion disposed on the outer wall facing the engagement protrusion portion and engageable with the engagement protrusion portion.

* * * * *